(12) United States Patent
Kirkby et al.

(10) Patent No.: US 9,009,805 B1
(45) Date of Patent: Apr. 14, 2015

(54) METHOD AND SYSTEM FOR PROVISIONING AN ELECTRONIC DEVICE

(71) Applicant: Google Inc., Mountain View, CA (US)

(72) Inventors: Ronald L. Kirkby, San Bruno, CA (US); Hiro Mitsuji, San Francisco, CA (US); Eden Sherry, San Francisco, CA (US); Lawrence W. Neal, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/510,023

(22) Filed: Oct. 8, 2014

Related U.S. Application Data

(60) Provisional application No. 62/057,991, filed on Sep. 30, 2014.

(51) Int. Cl.
H04W 12/08 (2009.01)
H04L 29/06 (2006.01)

(52) U.S. Cl.
CPC ........... *H04W 12/08* (2013.01); *H04L 63/0428* (2013.01)

(58) Field of Classification Search
USPC .................................. 726/7, 9, 4, 5; 709/203
See application file for complete search history.

(56) References Cited

U.S. PATENT DOCUMENTS

| | | | |
|---|---|---|---|
| 8,613,070 B1* | 12/2013 | Borzycki et al. | 726/8 |
| 2010/0192212 A1* | 7/2010 | Raleigh | 726/7 |
| 2011/0107364 A1* | 5/2011 | Lajoie et al. | 725/25 |
| 2012/0011567 A1* | 1/2012 | Cronk et al. | 726/4 |
| 2012/0216296 A1* | 8/2012 | Kidron | 726/28 |
| 2013/0086665 A1* | 4/2013 | Filippi et al. | 726/7 |
| 2013/0268357 A1* | 10/2013 | Heath | 705/14.53 |
| 2013/0276140 A1* | 10/2013 | Coffing | 726/27 |
| 2013/0340050 A1* | 12/2013 | Harrison | 726/4 |
| 2014/0007222 A1* | 1/2014 | Qureshi et al. | 726/16 |
| 2014/0068705 A1* | 3/2014 | Chambers et al. | 726/1 |
| 2014/0068789 A1* | 3/2014 | Watts et al. | 726/29 |
| 2014/0137188 A1* | 5/2014 | Bartholomay et al. | 726/3 |
| 2014/0157370 A1* | 6/2014 | Plattner et al. | 726/4 |
| 2014/0173692 A1* | 6/2014 | Srinivasan et al. | 726/4 |
| 2014/0189808 A1* | 7/2014 | Mahaffey et al. | 726/4 |
| 2014/0245411 A1* | 8/2014 | Meng et al. | 726/7 |
| 2014/0245461 A1* | 8/2014 | O'Neill et al. | 726/28 |
| 2014/0282877 A1* | 9/2014 | Mahaffey et al. | 726/3 |

\* cited by examiner

*Primary Examiner* — Haresh N Patel
(74) *Attorney, Agent, or Firm* — Morgan, Lewis & Bockius LP

(57) ABSTRACT

This application discloses a method of provisioning an electronic device. The electronic device proactively broadcasts an advertising packet that includes a device identifier associated with the electronic device. A server receives the device identifier via a client device, and issues a link approval response when it verifies that the electronic device associated with the device identifier is available for provisioning in association with a user account. In response to the link approval response, the electronic device and the client device establish communication via a short range wireless link. The client device encrypts at least a portion of network credentials of a secure wireless network using a password key generated at the server, and provides the encrypted network credentials to the electronic device. The electronic device decrypts the encrypted network credentials using a key generated at the electronic device, and accesses the secure wireless network using the decrypted network credentials.

20 Claims, 21 Drawing Sheets

In response to receiving the link approval response indicating that the electronic device associated with the device identifier is available for provisioning in association with the user account:

Generating an authentication tag and the password key by the server based on the random number 1230

The password key is encrypted by the server based on both the random number and a device secret known to the server and the electronic device 1232

Forwarding the authentication tag to the electronic device via the client device, wherein the electronic device verifies the authentication tag based on the random number, (wherein the client device encrypts the at least a portion of the network credentials using the password key only when the electronic device verifies the authentication tag) 1234

The random number, the authentication tag and the encrypted network credentials are communicated between the electronic device and the client device via the short range wireless link 1236

Identifying by the electronic device a list of available secure networks in a secure network scan 1238

Providing the list of available secure networks to the client device, wherein the client device is configured to determine the secure wireless network from a list of available secure networks 1240

The client device determines the secure wireless network from the list of available secure networks, by displaying the list of available secure networks on a provisioning interface displayed on the client device and receiving a user selection of the secure wireless network 1242

FIGURE 12C

In response to receiving the link approval response indicating that the electronic device associated with the device identifier is available for provisioning in association with the user account:

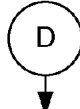

Obtaining, at the client device, network credentials for accessing a secure wireless network 1244

> The secure wireless network includes a wireless local area network (WLAN) 1246

> The network credentials of the secure wireless network further include at least a service set identifier (SSID) and a network password for the WLAN 1248

Encrypting, at the client device, at least a portion of the network credentials using a password key generated at the server and communicated from the server to the client device 1250

> The network credentials of the secure wireless network include a network password, the method further comprising: receiving, by the client device, a user input of the network password and encoding the network password using the password key provided by the server 1252

Sending the encrypted network credentials from the client device to the electronic device over the short range wireless link 1254

Obtaining, at the electronic device, decrypted network credentials by decrypting the encrypted network credentials using a key generated at the electronic device 1256

Accessing, by the electronic device, the secure wireless network using the decrypted network credentials 1258

> The client device communicates with the server at least partially via the secure wireless network 1260

> The client device communicates with the server independently of the secure wireless network 1262

FIGURE 12D

On an electronic device having one or more processors and memory storing one or more programs for execution by the one or more processors, wherein the electronic device is located in proximity to a client device and shares a device specific secret with a server

- Proactively broadcasting advertising packets that include a device identifier uniquely associated with the electronic device 1302

- In accordance with a link approval response that is generated by the server to verify that the device identifier of the electronic device is not associated with any user account, establishing communication with the client device via a wireless link for short range communication 1304

- Establishing communication with the server via a secure network by:

- Providing a random number to the server via the client device 1306

- Verifying an authentication tag that is generated by the server based on the random number and forwarded to the electronic device by the client device 1308

- In accordance with the verification of the authentication tag, obtaining encrypted network credentials of a preferred secure network, wherein network credentials of the preferred secure network are encrypted in the client device using a password key generated by the server based on the random number 1310

- Recovering the network credentials of the preferred secure network using the password key recreated from the random number 1312

- Using the recovered network credentials to communicate with the server via the preferred secure network, independently from the client device 1314

FIGURE 13

On a client device having one or more processors and memory storing one or more programs for execution by the one or more processors Creating and logging onto a user account managed by a server 1402

Associating the user account with an electronic device by (1) forwarding to the server a device identifier that is uniquely associated with the electronic device, and (2) receiving, from the server, a link approval response that verifies that the electronic device is not associated with any user account, wherein the electronic device is located in proximity to the client device, and the device identifier is received in advertising packets proactively broadcast by the electronic device 1404

After receiving the link approval response, establishing communication via a secure network for the electronic device and the server by:

Forwarding a random number to the server, wherein the random number is provided to by the electronic device 1406

Receive, from the server, payload data that include an authentication tag and a password key both generated based on the random number 1408 after a verification of the authentication tag by the electronic device, providing encrypted network credentials of a preferred secure network to the electronic device, wherein network credentials of the preferred secure network are encrypted using a password key generated by the server based on the random number 1410

Sending the encrypted network credentials to the electronic device, wherein the electronic device is configured to recreate the password key from the random number, recover the network credentials of the preferred secure network using the password key, and apply the recovered network credentials to communicate with the server via the preferred secure network, independently from the client device 1412

FIGURE 14 on a server having one or more processors and memory storing one or more programs for execution by the one or more processors, wherein the shares a device specific secret with the electronic device:

Enabling a client device to log onto a user account managed by the server 1502

Associating the user account with the electronic device by (1) receiving, via a client device, a device identifier that is uniquely associated with the electronic device, and (2) generating a link approval response that verifies that the electronic device is not associated with any user account, wherein the electronic device is located in proximity to the client device, and the device identifier is received by the client device in advertising packets proactively broadcast by the electronic device 1504

Establishing communication with the electronic device via a secure network by:

Receiving a random number from the electronic device via the client device 1506

Generating payload data based on the random number, wherein the payload data include an authentication tag and a password key 1508

Providing the authentication tag and the password key to the client device, wherein the client device is configured to encrypt network credentials of a preferred secure network using the password key after a verification of the authentication tag by the electronic device, and the electronic device is configured to recreate the password key from the random number and recover the network credentials of the preferred secure network using the password key 1510

Communicating with the electronic device via the preferred secure network based on the recovered network credentials, independently from the client device 1512

FIGURE 15

METHOD AND SYSTEM FOR PROVISIONING AN ELECTRONIC DEVICE

PRIORITY CLAIM AND RELATED APPLICATIONS

This application claims priority to U.S. Provisional Patent Application No. 62/057,991, filed Sep. 30, 2014, entitled "Method and System for Video Monitoring," which is hereby incorporated by reference in its entirety.

This application is related to U.S. Design patent application Ser. No. 29/504,605, filed Oct. 7, 2014, entitled "Video Monitoring User Interface with Event Timeline and Display of Multiple Preview Windows At User-Selected Event Marks," which is hereby incorporated by reference in its entirety.

TECHNICAL FIELD

This relates generally to computer technology, including but not limited to methods and systems for provisioning an electronic device by associating a user account with the electronic device and establishing a secure network connection for the electronic device.

BACKGROUND

Video surveillance produces a large amount of continuous video data over the course of hours, days, and even months. Such video data includes many long and uneventful portions that are of no significance or interest to a reviewer. In some existing video surveillance systems, motion detection is used to trigger alerts or video recording. However, using motion detection as the only means for selecting video segments for user review may still produce too many video segments that are of no interest to the reviewer. For example, some detected motions are generated by normal activities that routinely occur at the monitored location, and it is tedious and time consuming to manually scan through all of the normal activities recorded on video to identify a small number of activities that warrant special attention. In addition, when the sensitivity of the motion detection is set too high for the location being monitored, trivial movements (e.g., movements of tree leaves, shifting of the sunlight, etc.) can account for a large amount of video being recorded and/or reviewed. On the other hand, when the sensitivity of the motion detection is set too low for the location being monitored, the surveillance system may fail to record and present video data on some important and useful events.

It is a challenge to identify meaningful segments of the video stream and to present them to the reviewer in an efficient, intuitive, and convenient manner. Human-friendly techniques for discovering and presenting motion events of interest both in real-time or at a later time are in great need.

In some environments, the large amount of information produced by home monitoring devices is communicated to a remote server to enable long term off-site storage and sharing of the information. Because this information (such as videos produced by surveillance cameras) could involve private subscriber information, it is important that transmission of the data between the home monitoring device and remote server is secure. Similarly, it is important that the process of provisioning an electronic monitoring device (i.e., the process of associating the device with an account/user and configuring the device to communicate with a remote server—e.g., via a home wireless network connected to the Internet via a router) is secure. For example, a provisioning process for a home monitoring device should prevent unauthorized access to the home monitoring device and should also protect network security credentials (e.g., network encryption keys and passwords). In addition to being secure, a provisioning process should be user-friendly. This could be a challenge given that many home monitoring devices have constrained user interfaces. For example, a small surveillance camera is unlikely to have a display or a rich set of user interface controls that can be used in a provisioning process.

A home monitoring device can be provisioned via an application running on a second device connected to the home monitoring device, but that could expose the device to unauthorized use and/or expose network security credentials—especially if the home monitoring device and the second device are connected by an unsecure wireless link. Some risk of exposure of network credentials can be prevented by using direct wired connections between the home monitoring device and the second device and/or an Internet router during provisioning, but direct wired connections are less convenient than wireless links, and even with the use of wired connections, confidential device and network information could still be compromised if saved in the clear on the second device and/or the server. For the above reasons, it would be useful to provide methods for provisioning electronic monitoring devices that are both convenient and secure.

SUMMARY

Accordingly, there is a need for provisioning an electronic device (e.g., a video surveillance camera or other monitoring device) by associating the electronic device with a user account and establishing secure communication for the electronic device in a secure and wireless manner. Such methods optionally complement or replace conventional methods of using a wired connection with a personal computer or other second device to establish secure communications for the electronic device during and after provisioning.

In accordance with one aspect of this application, a device provisioning method is executed by an electronic device, a client device and a server. The device provisioning method includes logging onto a user account managed by the server from the client device, broadcasting by the electronic device an advertising packet that includes a device identifier uniquely associated with the electronic device, and transmitting the advertising packet to the server via the client device as part of a link approval request. The device provisioning method further includes in response to receiving the link approval request, verifying by the server that the electronic device associated with the device identifier is available for provisioning in association with the user account and, when verified, issuing by the server a link approval response to the client device, the link approval response indicating that the electronic device associated with the device identifier is available for provisioning in association with the user account.

The device provisioning method further includes, in response to receiving the link approval response indicating that the electronic device associated with the device identifier is available for provisioning in association with the user account: establishing a short range wireless link between the electronic device and the client device; obtaining, at the client device, network credentials for accessing a secure wireless network; encrypting, at the client device, at least a portion of the network credentials using a password key generated at the server and communicated from the server to the client device; sending the encrypted network credentials from the client device to the electronic device over the short range wireless link; and obtaining, at the electronic device, decrypted network credentials by decrypting the encrypted network credentials using a key generated at the electronic device. The device provisioning method further includes accessing, by the electronic device, the secure wireless network using the decrypted network credentials.

In accordance with some implementations, a computer system includes one or more processors, memory, and one or more programs; the one or more programs are stored in the memory and configured to be executed by the one or more processors and the one or more programs include instructions for performing the operations of any of the methods described above. In accordance with some implementations, a computer readable storage medium has stored therein instructions which when executed by a computer system with one or more processors, cause the computing system to perform the operations of any of the methods described above. In accordance with some implementations, a computer system includes means for performing the operations of any of the methods described above.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 12A-12D are flow diagrams illustrating an exemplary method of provisioning an electronic device in accordance with some implementations.

FIG. 13 is a flow diagram illustrating an exemplary method that is implemented by an electronic device to provision the electronic device in accordance with some implementations.

FIG. 14 is a flow diagram illustrating an exemplary method that is implemented by a client device to provision an electronic device in accordance with some implementations.

FIG. 15 is a flow diagram illustrating an exemplary method that is implemented by a server system to provision an electronic device in accordance with some implementations.

Like reference numerals refer to corresponding parts throughout the several views of the drawings.

DESCRIPTION OF IMPLEMENTATIONS

Figure 1:
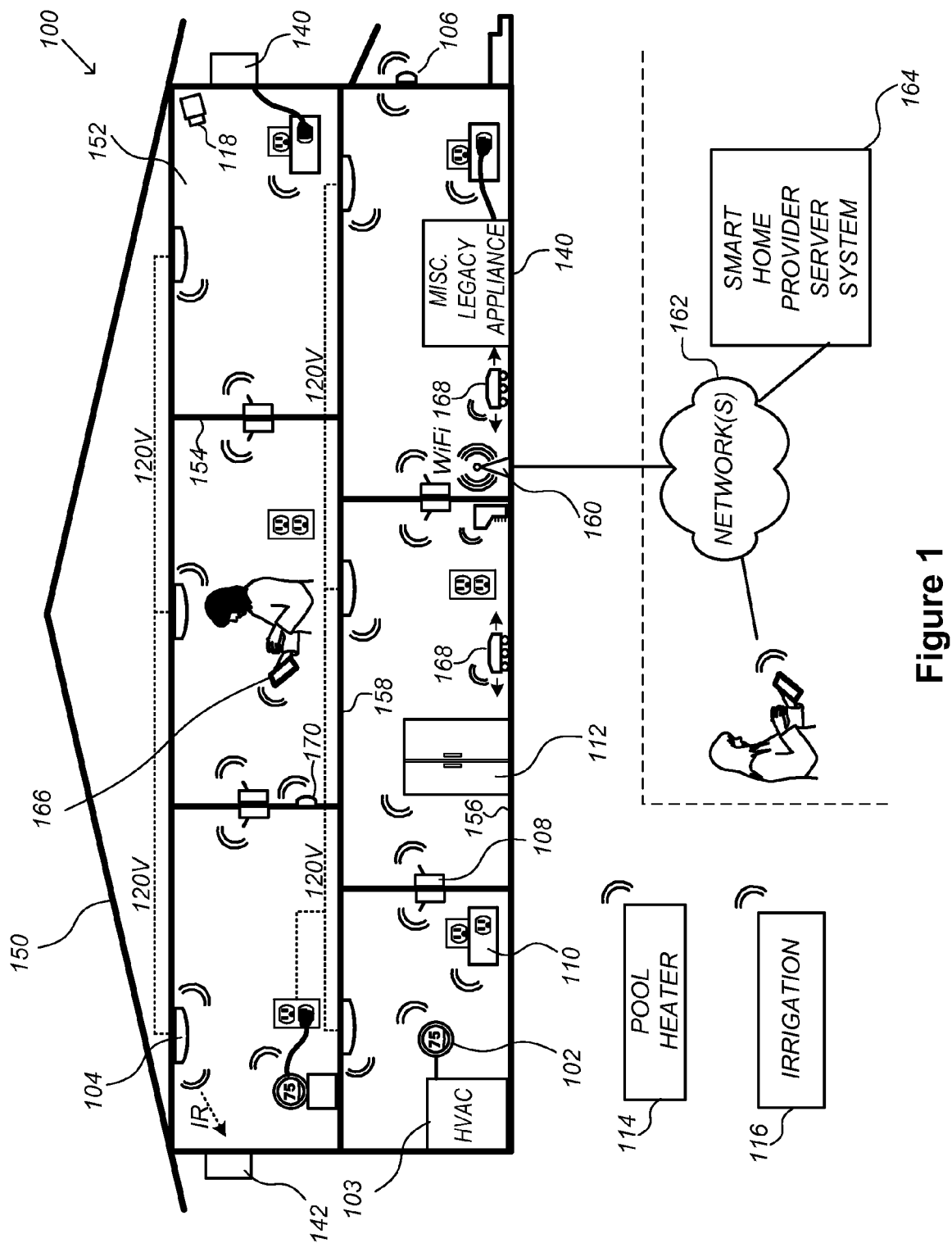
FIG. 1 is a representative smart home environment in accordance with some implementations.

In accordance with various implementations of the present invention, an electronic device is placed in proximity to a client device during the course of provisioning the electronic device. The electronic device broadcasts advertising packets for the purpose of identifying itself and facilitating establishing of a short range wireless link with the client device. In some situations, the short range wireless link has a limited security level (as in the case of a classical Bluetooth link or a Bluetooth Low Energy (BLE) link without optional security features). However, the short range wireless link is convenient for clients and provisioning as it is widely implemented in client devices (e.g., in smart phones, laptop computers and tablet computers) automatically established and demands little or no user intervention. Using the short range wireless link, the client device functions as an intermediary device that helps exchange information between the electronic device and a server, before communication via any secure wireless network is made available between the electronic device and the server. Exemplary information that can be exchanged between the electronic device and the server includes, but is not limited to device identifiers, encryption seeds (e.g., random numbers), authentication tokens and tags, and flags. In some implementations, the client device encrypts security sensitive data (e.g., network credentials of secure networks) before communicating them over the short range wireless link.

Further, during the course of provisioning the electronic device, the client device functions temporarily as an input/output interface to enable the electronic device to be associated with a user account managed by a server system and establish secure communication with the server system. As noted above, sensitive information exchanged between the server and the electronic device via the client device is protected from being intercepted by encryption (e.g., by the electronic device being provisioned). In some implementations, the electronic device encrypts sensitive information with a device secret that is specific to the electronic device being provisioned and that is known only to the electronic device and the server, which is responsible for managing the process by which a specific electronic device is associated with and provisioned for a specific user account.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both user interfaces, but they are not the same user interface.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is a representative smart home environment in accordance with some implementations. Smart home environment 100 includes a structure 150, which is optionally a house, office building, garage, or mobile home. It will be appreciated that devices may also be integrated into a smart home environment 100 that does not include an entire structure 150, such as an apartment, condominium, or office space. Further, the smart home environment may control and/or be coupled to devices outside of the actual structure 150. Indeed, several devices in the smart home environment need not be physically within the structure 150. For example, a device controlling a pool heater 114 or irrigation system 116 may be located outside of structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the smart home environment 100 includes a plurality of devices, including intelligent, multi-sensing, network-connected devices, that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), and one or more intelligent, multi-sensing, network-connected entryway interface devices 106 (hereinafter referred to as "smart doorbells 106"). In some implementations, the smart thermostat 102 detects ambient climate characteristics (e.g., temperature and/or humidity) and controls a HVAC system 103 accordingly. The smart hazard detector 104 may detect the presence of a hazardous substance or a substance indicative of a hazardous substance (e.g., smoke, fire, and/or carbon monoxide). The smart doorbell 106 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device (e.g., a smartphone) 166. A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure.

As discussed above, users may control the smart thermostat and other smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering the devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, the devices 102, 104, 106, 108, 110, 112, 114, 116, and/or 118 (collectively referred to as "the smart devices") are capable of data communications and information sharing with other smart devices, a central server or cloud-computing system, and/or other devices that are network-connected. The required data communications may be carried out using any of a variety of custom or standard wireless protocols (IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (CAT6 Ethernet, HomePlug, etc.), or any other suitable communication protocol, including communication protocols not yet developed as of the filing date of this document.

In some implementations, the smart devices serve as wireless or wired repeaters. For example, a first one of the smart devices communicates with a second one of the smart devices via a wireless router. The smart devices may further communicate with each other via a connection to one or more networks 162 such as the Internet. Through the one or more networks 162, the smart devices may communicate with a smart home provider server system 164 (also called a central server system and/or a cloud-computing system herein). In some implementations, the smart home provider server system 164 may include multiple server systems each dedicated to data processing associated with a respective subset of the smart devices (e.g., a video server system may be dedicated to data processing associated with camera(s) 118). The smart home provider server system 164 may be associated with a manufacturer, support entity, or service provider associated with the smart device. In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

Figure 2:
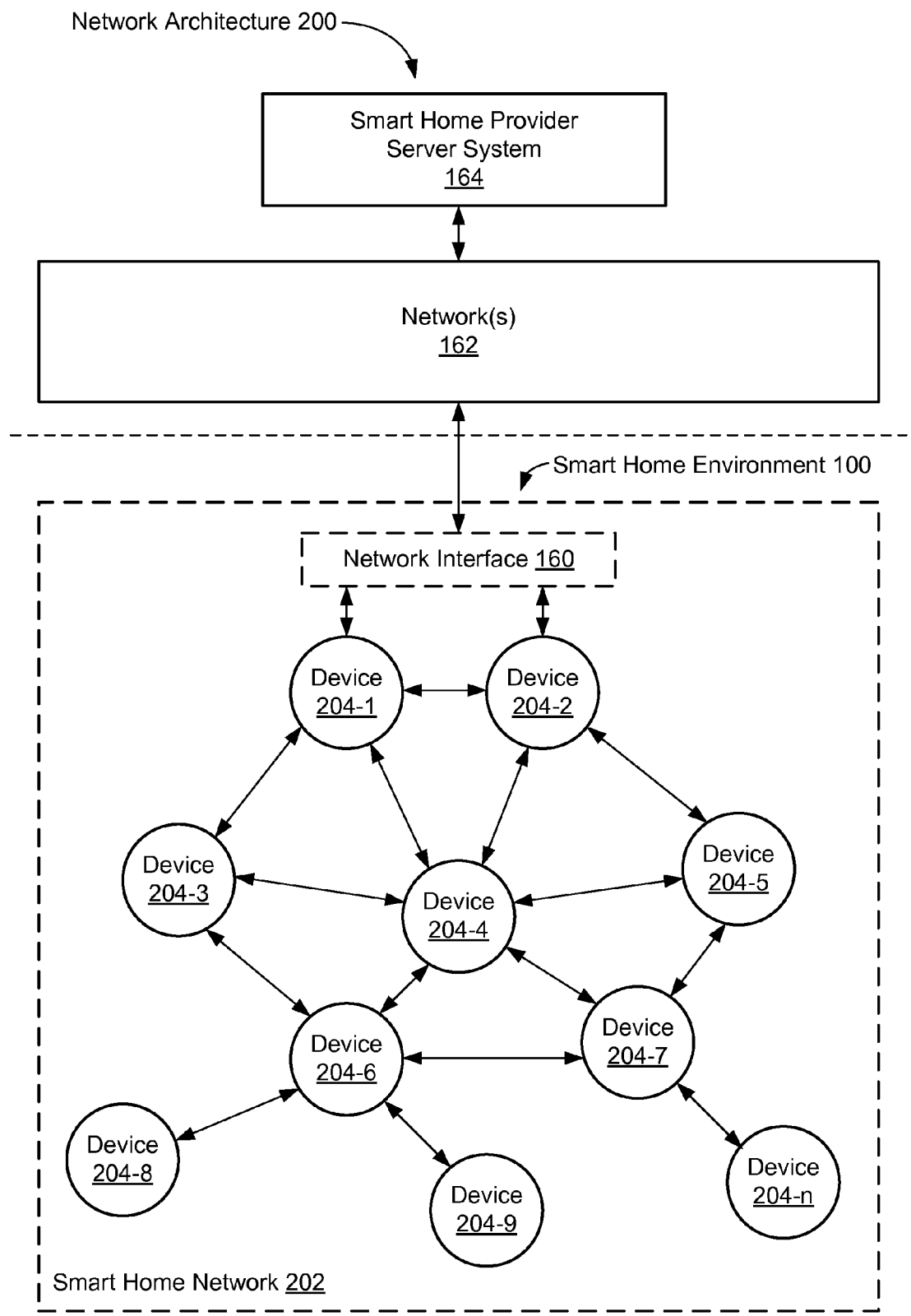
FIG. 2 is a block diagram illustrating a representative network architecture that includes a smart home network in accordance with some implementations.

FIG. 2 is a block diagram illustrating a representative network architecture 200 that includes a smart home network 202 in accordance with some implementations. In some implementations, one or more smart devices 204 in the smart home environment 100 (e.g., the devices 102, 104, 106, 108, 110, 112, 114, 116, and/or 118) combine to create a mesh network in the smart home network 202. In some implementations, the one or more smart devices 204 in the smart home network 202 operate as a smart home controller. In some implementations, a smart home controller has more computing power than other smart devices. In some implementations, a smart home controller processes inputs (e.g., from the smart device(s) 204, the electronic device 166, and/or the smart home provider server system 164) and sends commands (e.g., to the smart device(s) 204 in the smart home network 202) to control operation of the smart home environment 100. In some implementations, some of the smart device(s) 204 in the mesh network are "spokesman" nodes (e.g., node 204-1) and others are "low-powered" nodes (e.g., node 204-9). Some of the smart device(s) 204 in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the central server or cloud-computing system 164. In some implementations, one or more "spokesman" nodes operate as a smart home controller. On the other hand, the devices that are battery powered are referred to as "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

As described, the spokesman nodes and some of the low-powered nodes are capable of "listening." Accordingly, users, other devices, and/or the central server or cloud-computing system 164 may communicate control commands to the low-powered nodes. For example, a user may use the portable electronic device 166 (e.g., a smartphone) to send commands over the Internet to the central server or cloud-computing system 164, which then relays the commands to one or more spokesman nodes in the smart home network 202. The spokesman nodes drop down to a low-power protocol to communicate the commands to the low-power nodes throughout the smart home network 202, as well as to other spokesman nodes that did not receive the commands directly from the central server or cloud-computing system 164.

In some implementations, a smart nightlight 170 is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart home network 202 as well as over the one or more networks 162 to the central server or cloud-computing system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, the smart hazard detectors 104 may send messages that correspond to each of the respective sensors to the other devices and/or the central server or cloud-computing system 164, such as by using the mesh network as described above.

Examples of spokesman nodes include smart doorbells 106, smart thermostats 102, smart wall switches 108, and smart wall plugs 110. These devices 102, 106, 108, and 110 are often located near and connected to a reliable power source, and therefore may include more power-consuming components, such as one or more communication chips capable of bidirectional communication in a variety of protocols.

In some implementations, the smart home environment 100 includes service robots 168 that are configured to carry out, in an autonomous manner, any of a variety of household tasks.

Figure 3:
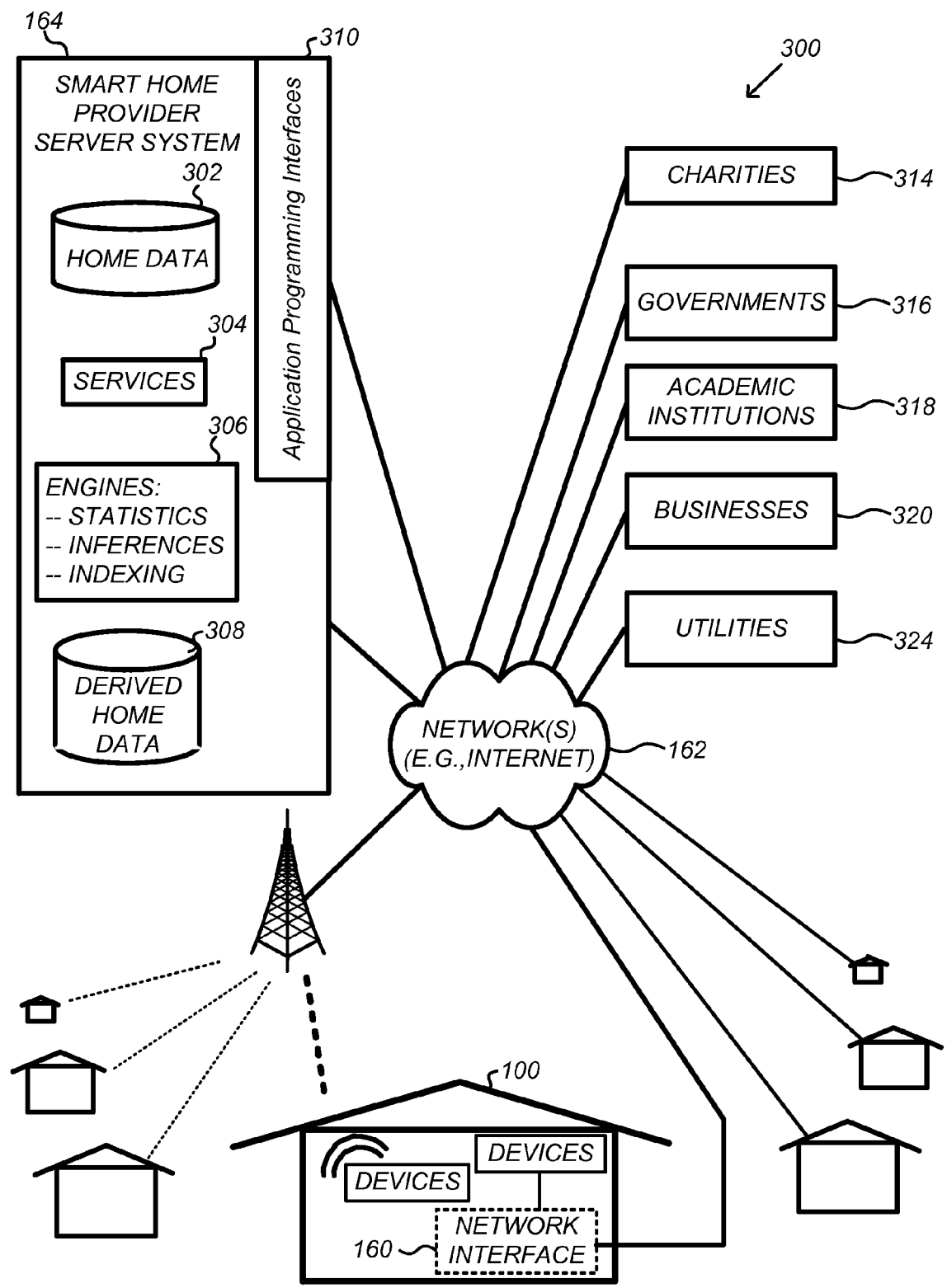
FIG. 3 illustrates a network-level view of an extensible devices and services platform with which the smart home environment of FIG. 1 is integrated, in accordance with some implementations.

FIG. 3 illustrates a network-level view of an extensible devices and services platform 300 with which the smart home environment 100 of FIG. 1 is integrated, in accordance with some implementations. The extensible devices and services platform 300 includes remote servers or cloud computing system 164. Each of the intelligent, network-connected devices 102, 104, 106, 108, 110, 112, 114, 116, and 118 from FIG. 1 (identified simply as "devices" in FIGS. 2-4) may communicate with the remote servers or cloud computing system 164. For example, a connection to the one or more networks 162 may be established either directly (e.g., using 3G/4G connectivity to a wireless carrier), or through a network interface 160 (e.g., a router, switch, gateway, hub, or an intelligent, dedicated whole-home control node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments, where the devices may routinely transmit home data or may transmit home data in specific instances (e.g., when a device queries the home data 302). Example collected home data 302 includes, without limitation, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes. Example services 304 include, without limitation, software updates, customer support, sensor data collection/logging, remote access, remote or distributed control, and/or use suggestions (e.g., based on the collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and the services platform 300 includes a processing engine 306, which may be concentrated at a single server or distributed among several different computing entities without limitation. In some implementations, the processing engine 306 includes engines configured to receive data from the devices of smart home environments (e.g., via the Internet and/or a network interface), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, use statistics, use statistics relative to use of other devices, use patterns, and/or statistics summarizing sensor readings are generated by the processing engine 306 and transmitted. The results or statistics may be provided via the one or more networks 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications, such as web applications or mobile applications, that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
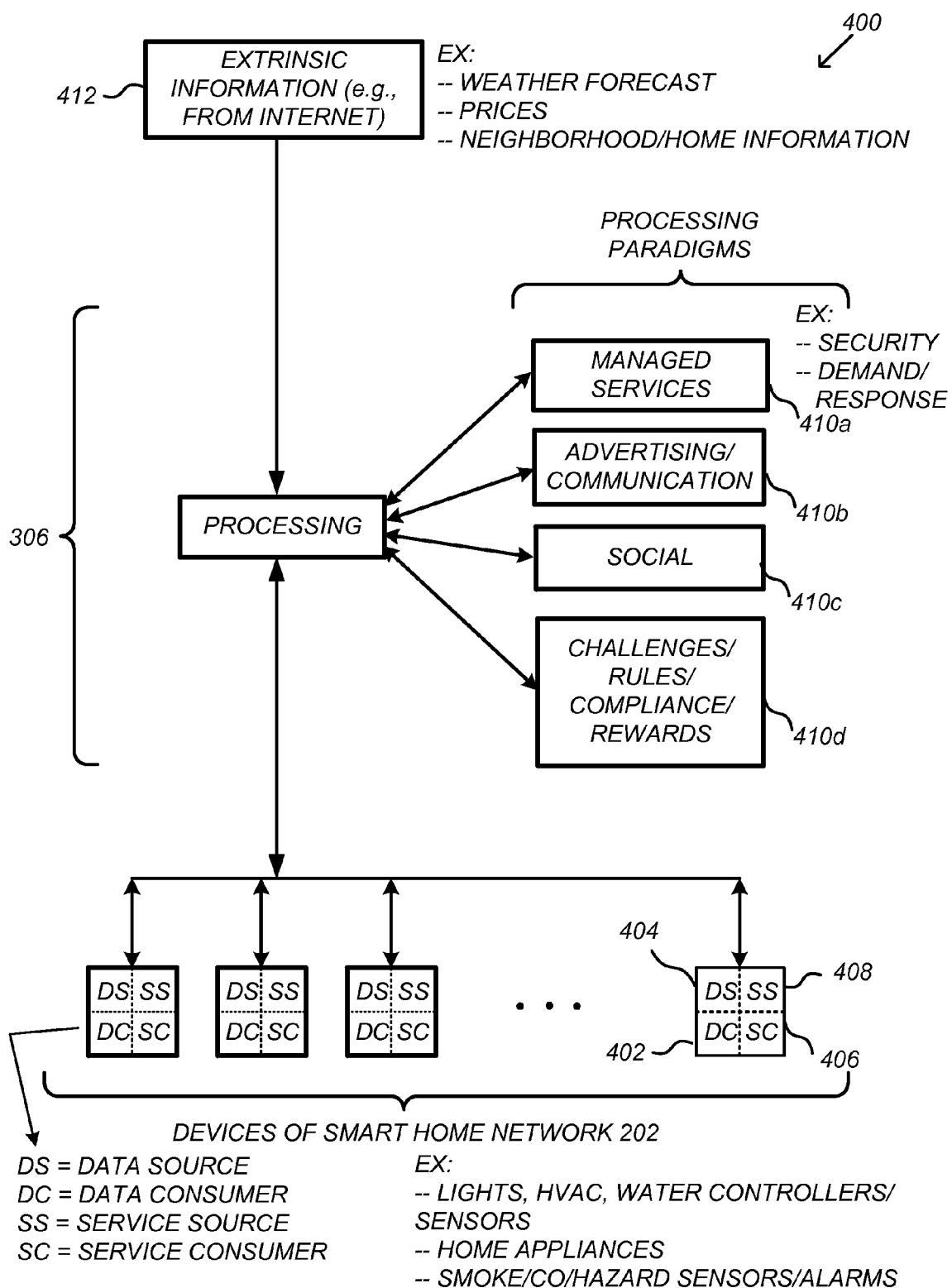
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows the processing engine 306 as including a number of processing paradigms 410. In some implementations, the processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, and/or alerting a user of a current or predicted future event or characteristic. In some implementations, the processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, the processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, the processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, the processing engine 306 integrates or otherwise uses extrinsic information 412 from extrinsic sources to improve the functioning of one or more processing paradigms. The extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
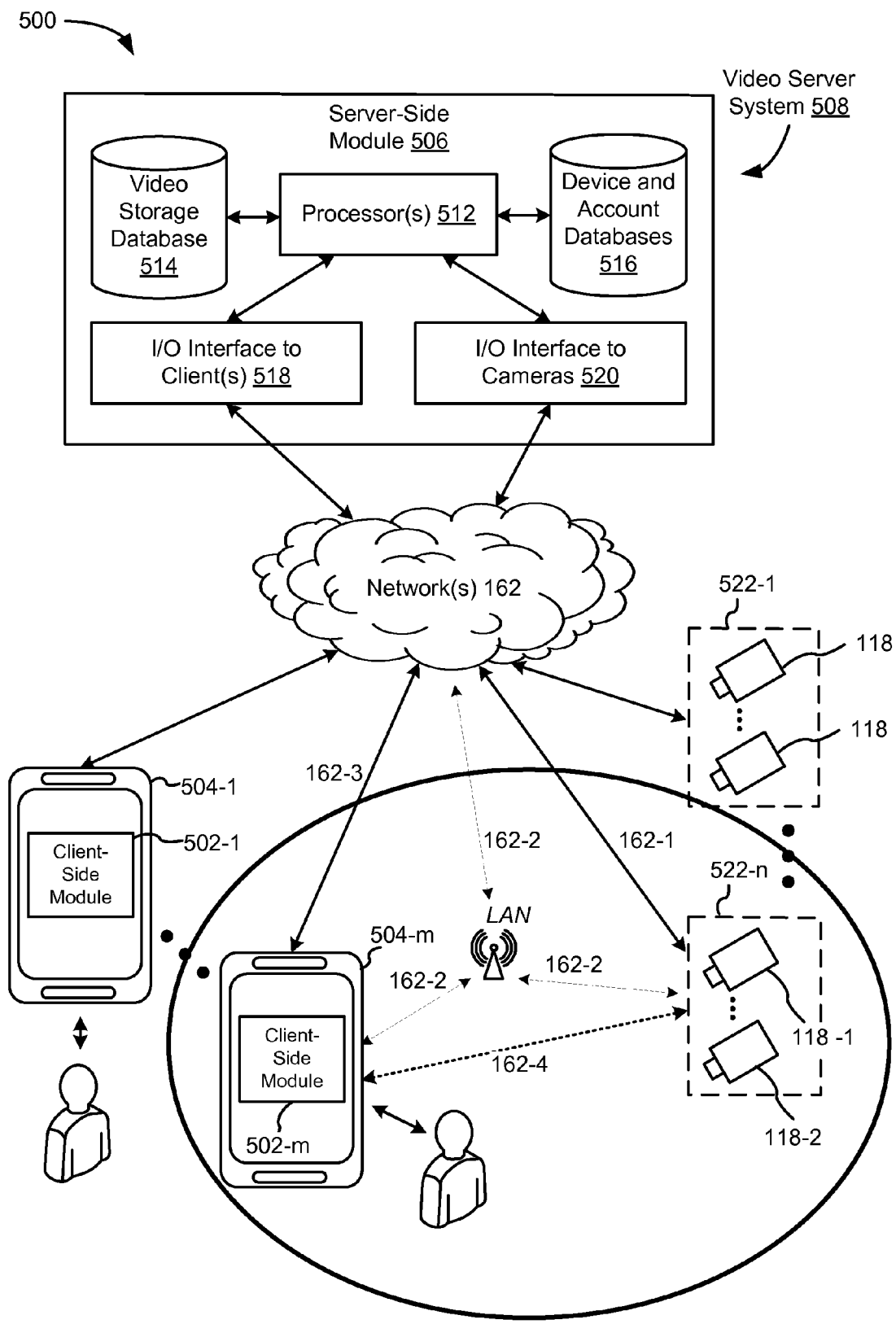
FIG. 5 is a representative operating environment in which a video server system interacts with client devices and video sources in accordance with some implementations.

FIG. 5 illustrates a representative operating environment 500 in which a video server system 508 provides data processing for monitoring and facilitating review of motion events in video streams captured by video cameras 118. As shown in FIG. 5, the video server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the video server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 508. In some implementations, the video server system 508 is a dedicated video processing server that provides video processing services to video sources and client devices 504 independent of other services provided by the video server system 508.

In some implementations, each of the video sources 522 includes one or more video cameras 118 that capture video and send the captured video to the video server system 508 substantially in real-time. In some implementations, each of the video sources 522 optionally includes a controller device (not shown) that serves as an intermediary between the one or more cameras 118 and the video server system 508. The controller device receives the video data from the one or more cameras 118, optionally, performs some preliminary processing on the video data, and sends the video data to the video server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 508.

As shown in FIG. 5, in accordance with some implementations, each of the client devices 504 includes a client-side module 502. The client-side module 502 communicates with a server-side module 506 executed on the video server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 508 is implemented on one or more standalone data processing apparatuses or a distributed network of computers. In some implementations, the video server system 508 also employs various virtual devices and/or services of third party service providers (e.g., third-party cloud service providers) to provide the underlying computing resources and/or infrastructure resources of the video server system 508. In some implementations, the video server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the video server system 508 can vary in different implementations. For example, in some implementations, client-side module 502 is a thin-client that provides only user-facing input and output processing functions, and delegates all other data processing functionalities to a backend server (e.g., the video server system 508). Similarly, in some implementations, a respective one of the video sources 522 is a simple video capturing device that continuously captures and streams video data to the video server system 508 without no or limited local preliminary processing on the video data. Although many aspects of the present technology are described from the perspective of the video server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 508, the client device 504, and the video sources 522 cooperatively.

It should be understood that operating environment 500 that involves video server system 508, video sources 522 and video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using one or more communication networks 162. In some implementations, two or more devices (e.g., electronic devices 118-1 and 118-2, and client devices 166-m) are located in close proximity to each other, such that they could be communicatively coupled in the same sub-network via wired connections, a WLAN or a Bluetooth Personal Area Network (PAN). The Bluetooth PAN is optionally established based on classical Bluetooth technology or Bluetooth Low Energy (BLE) technology.

During normal operation, the electronic devices send data it has captured to the server system via secure network connections (e.g., a Wi-Fi network link 162-1 and a wired link 162-2), and the client devices also receive processed data from the server via secure network connections (e.g., a Wi-Fi network link 162-2 and a cellular network link 162-3). Under some circumstances, a short range communication network 162-4 (e.g., a Bluetooth PAN) offers a lower security level than these secure network connections, and therefore, is not used for secure data communication among the server system 606, the electronic devices and the client devices. Instead, in various implementations of the present application, short range communication network 162-4 is used to provision a new electronic device. Specially, in some implementations, short range communication network 162-4 is used to facilitate association of the electronic devices with a user account managed by the server and establishing of the secure network connections between the server system and the new electronic device.

In some implementations, each client device includes a respective client-side module 502 that functions to provision new electronic devices in conjunction with a server-side module 506 executed on the server system. Note that a device provision operation bonds a new electronic device with a user account managed on the server system, and is typically done the first time a user uses the electronic device. In some implementations, client-side module 502 provides client-side functionalities for identifying the new electronic device that is located in proximity to the client device, enabling communication with the electronic device via a short range wireless link, and using this short range communication to establish a secure network connection for the electronic device. In some implementations, server-side module 506 provides server-side functionalities for associating any number of the electronic devices with their corresponding user accounts and facilitating the short range communications between the client devices and the electronic devices for the purpose of setting up secure communications with the electronic devices.

In a specific example (e.g., the devices within the oval shown on FIG. 5), the electronic devices and the client device are communicatively coupled via a short range wireless link 162-4 which thereby facilitates establishing of secure communication by transferring network credentials associated with other secure network connections (e.g., the connections 162-1 and 162-2). The network credentials associated with the other secure network connections are transferred in an encrypted format over the short range communication network 162-4. Specifically, in some implementations, the client device encrypts the network credentials using a password key that is created by the server system based on a random number provided by the electronic device, and transfers the encrypted network credentials to the electronic device via the short range communication network 162-4. In some implementations, once the electronic device recovers the network credentials of the corresponding secure networks using the random number, it transfers data to the server system 606 via these other secure networks (i.e., not via the short range communication network 162-4) during its normal operation.

Figure 6A:
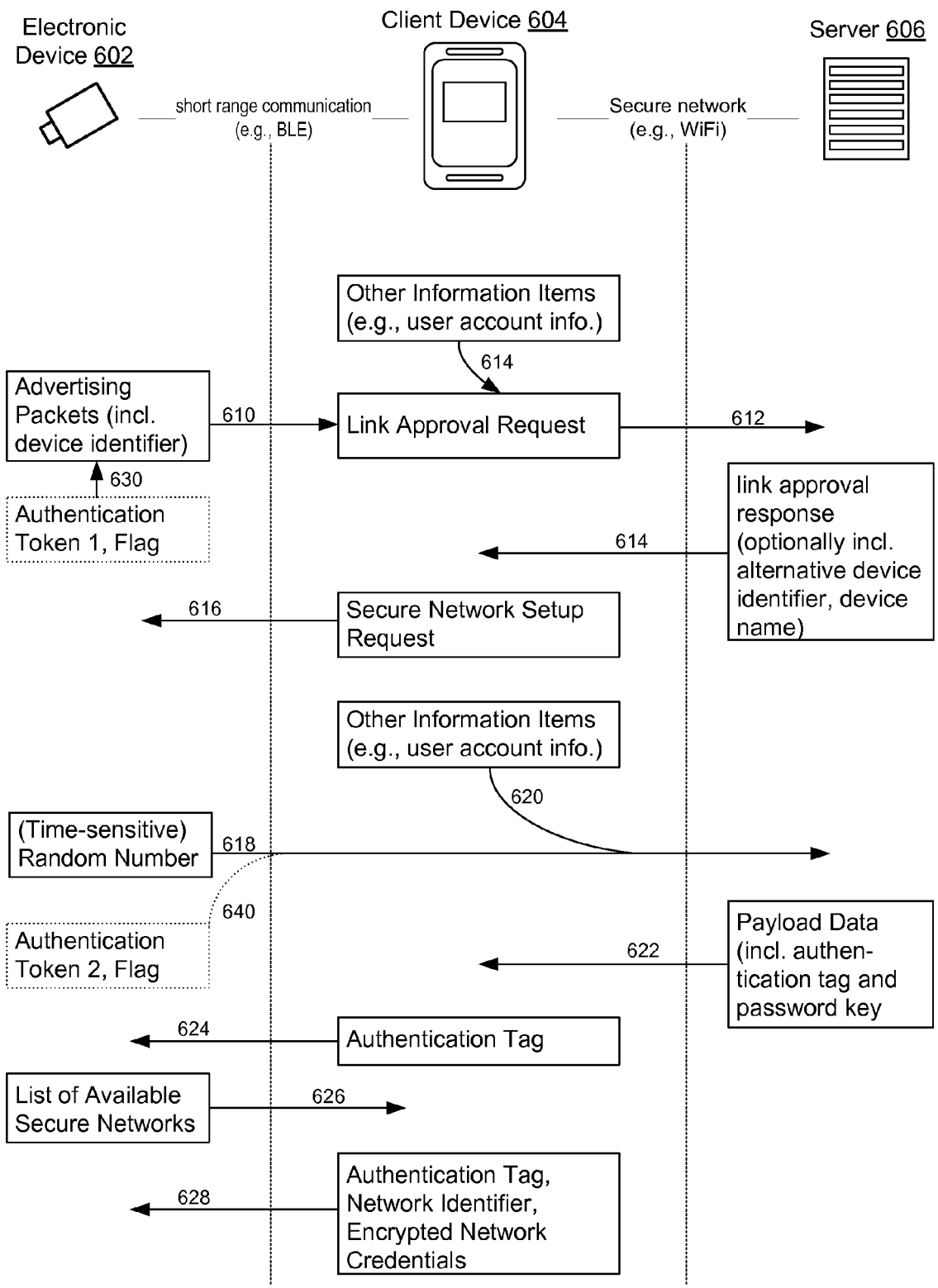
FIG. 6A is an exemplary diagram illustrating information flows during the course of provisioning an electronic device in an operating environment as shown in FIG. 5 in accordance with some implementations.

FIG. 6A is an exemplary diagram illustrating information flows during the course of provisioning an electronic device 602 in an operating environment 500 as shown in FIG. 5 in accordance with some implementations. The electronic device 602 is placed in proximity to a client device 604 (e.g., in the same physical area that could be covered by a short range wireless network). The electronic device 602 proactively broadcasts advertising packets each at least including a device identifier uniquely associated with the electronic device 602 (e.g., a media access control (MAC) address) (610). At the client device 604, a user has logged onto a user account that is created on a client-side application associated with the electronic device 602. The client device receives the advertising packets, and sends a link approval request to the server system 606 (612). The link approval request includes the advertising packets. In some implementations, the link approval request further includes one or more of other information items (e.g., information concerning the user account, an encryption type and an internet protocol (IP) address of the client device) (614).

Upon receiving the link approval request, the server system 606 obtains the device identifier associated with the electronic device 602, and searches its account database, to determine whether the electronic device 602 associated with the device identifier is available for provisioning in association with the user account. Specifically, in some implementations, the server system 606 determines whether the received device identifier has been associated with any user account (this user account or a different user account). When it is determined that the electronic device 602 is available for provisioning in association with this user account, the server system 606 associates the user account logged on by the client device 604 with the device identifier of the electronic device 602, and issues a link approval response to the client device 604 (614). In some implementations, the link approval response includes an alternative device identifier (e.g., a universally unique identifier (UUID)) and/or a device name associated with the electronic device 602. Both the device identifier and the alternative device identifier are used by the client device 604 and the server system 606 for referencing the electronic device 602. Optionally, the device name is used to represent the electronic device 602 on a provisioning interface displayed on the client device 604, and a user of the client device 604 is allowed to modify the device name on the provisioning interface.

Further, in accordance with the link approval response, the client device 602 is communicatively coupled to electronic device 604 via a short range wireless link. The client device 602 then sends a secure network setup request to the electronic device 602 via the wireless link, and initializes a secure network setup session for the electronic device 602 (616). In some implementations, the electronic device 602 and the client device 604 rely on the short range wireless link to communicate information directly during the entire secure network setup session.

In some implementations, after receiving the secure network setup request from the client device 604, the electronic device 602 generates an encryption seed (e.g., a random number) (618). Optionally, the random number is valid only for a predetermined duration of time (e.g., 15 minutes). The electronic device provides the random number to the client device 604 via the short range wireless link. The client device 604 then forwards the random number to the server system 606 in conjunction with one or more of other information items (e.g., the user account information) (620). Upon receiving the random number, the server system 606 generates an authentication tag and a password key based on the random number. In some implementations, the authentication tag and the password key are generated based on both the random number and a device specific key that is shared between the electronic device 602 and the server system 606. In some implementations, both the authentication tag and the password key have the same length (e.g., 16 bytes). Then, the server system 606 returns payload data that include at least the authentication tag and the password key to the client device 604 (622).

In some implementations, the client device 604 forwards the authentication tag to the electronic device 602 (624). In accordance with a verification of the authentication tag, the electronic device 602 implements a secure network scan and identifies a list of secure networks that are accessible by the electronic device 602. The client device 604 receives information regarding the list of available secure networks (626), and displays the list of available secure networks on the provisioning interface. When a user selects a preferred secure network from the list of available secure networks, the client device 604 encrypts network credentials of the preferred secure network using the password key that is provided by the server system 606. The client device 604 then sends the encrypted network credentials to the electronic device 602 (628). In some implementations, the client device 604 sends the authentication tag and a network identifier associated with the preferred secure network in conjunction with the encrypted network credentials. After receiving the encrypted network credentials, the electronic device 602 recovers the network credentials of the preferred secure network using the random number.

Figure 6B:
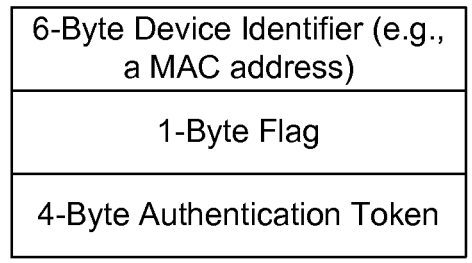
FIG. 6B is an exemplary custom data structure of advertising packets broadcast by an electronic device in accordance with some implementations.

FIG. 6B is an exemplary custom data structure of advertising packets broadcast by the electronic device 602 in accordance with some implementations. In some implementations, the advertising packets are broadcast by the electronic device 602 based on classical Bluetooth technology or BLE technology, but have a first custom data structure that is distinct from any data format used by a Bluetooth based network. Therefore, even if a Bluetooth receiver intercepts the advertising packets, it could not interpret the advertising packets without knowledge of the first custom data structure. In accordance with an exemplary first custom data structure as shown in FIG. 6B, each advertising packet includes (1) a six-byte device identifier (e.g., a MAC address or a serial number of the electronic device 602), (2) a one-byte flag that optionally indicates if a reset button provided by the electronic device 602 has been pushed, and (3) a four-byte authentication token that is generated based on the device identifier and a device specific secret (630). In a specific example, the six-byte device identifier and the one-byte flag is combined and hashed based on a predetermined cryptographic hash function (e.g., SHA-256), and the first four bytes of the hashing result are used as the four-byte authentication token.

Figure 6C:
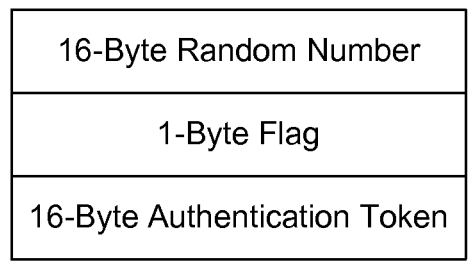
FIG. 6C is an exemplary custom data structure associated with a random number in accordance with some implementations.

Similarly, in some implementations, the random number is associated with a second custom data structure when it is forwarded from the electronic device 602 to the server system 606. FIG. 6C is an exemplary custom data structure associated with the random number in accordance with some implementations. In accordance with an exemplary custom data structure, each random number has sixteen bytes, and is followed with a one-byte flag and a sixteen-byte authentication token (640). The one-byte flag optionally indicates if a reset button provided by the electronic device 602 has been pushed. In some implementations, the sixteen-byte authentication token is generated based on the random number and the device specific secret. In a specific example, the six-byte device identifier, the sixteen-byte random number and the one-byte flag are combined and hashed based on a predetermined cryptographic hash function (e.g., SHA-256), and the first sixteen bytes of the hashing result are then used as the authentication token associated with the random number.

Note that implementations of the provisioning technology described herein that employ classical Bluetooth, BLE, or other widely available wireless technologies to provide short range communications between the electronic device 602 and the client device 604, do not require the use of security features provided by those technologies to secure such short range wireless communications. This is because appropriate security is provided by these implementations in such a way that dependence on particular third party security features is not required. This enhances user convenience and efficient communications between the client device and the electronic device.

In some implementations, upon receiving the device identifier or the random number, the server system 606 combines the received device identifier or random number with the device specific secret in the same manner as their respective authentication token is generated in the electronic device 602. When the server system 606 confirms the combining result and the received authentication token are consistent, it authenticates the electronic device 602, and validates the corresponding device identifier or random number.

Figure 7A:
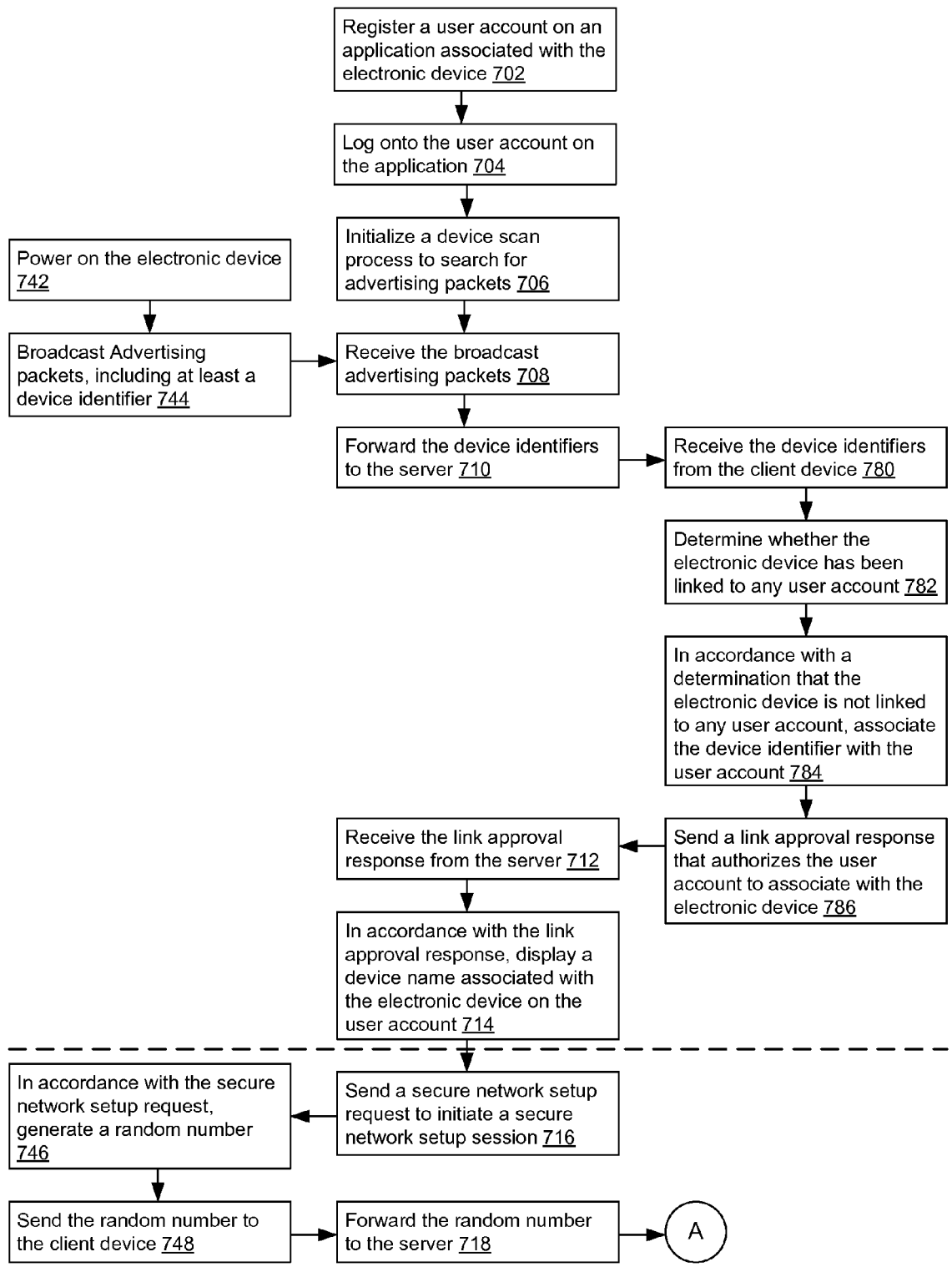
FIGS. 7A and 7B are flow diagrams illustrating an exemplary process of provisioning an electronic device in accordance with some implementations.
Figure 7B:
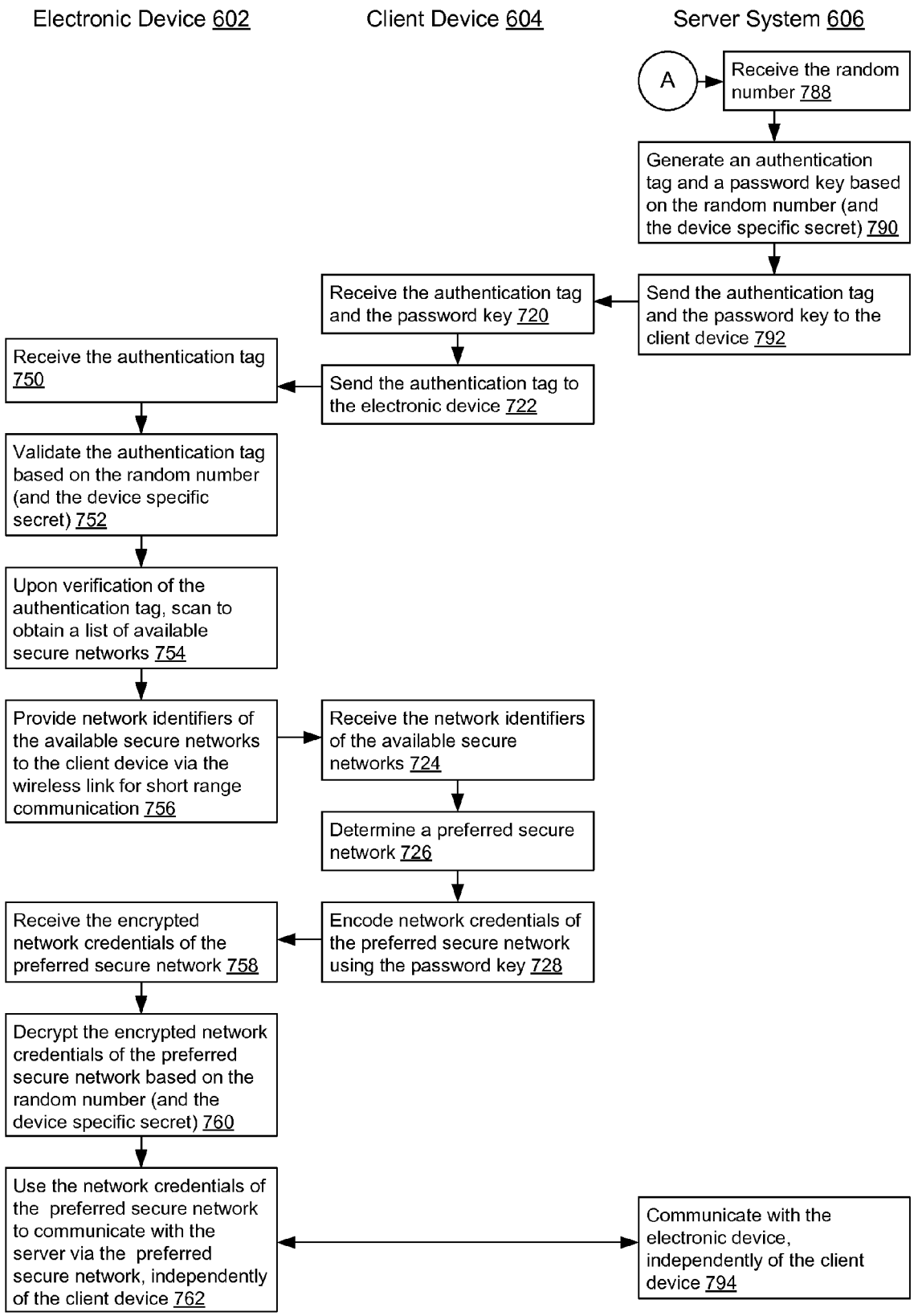

FIGS. 7A and 7B are flow diagrams illustrating an exemplary process of provisioning an electronic device in accordance with some implementations. This process 700 involves the client device 604 that functions as an intermediary device bridging the electronic device 602 and the server system 606 for the purpose of provisioning the electronic device 602. In association with FIGS. 7A and 7B, FIGS. 8A-8G are exemplary graphical user interfaces (GUI) that are displayed on the client device 604 during a device provisioning process in accordance with some implementations. Specifically, the GUI displays include provisioning interfaces 810-870 that are rendered on a display of the client device 604 by a client-side application that implements one or features of the client-side modules 112 described in reference to FIG. 10. When the electronic device 602 is a video camera, the client-side application enables GUIs for provisioning the video camera, e.g., associating the video camera with a user account and establishing its communication via a secure network. Once communication via a secure network is established, the client-side application enables another set of GUIs for controlling the video camera and displaying video data captured by the video camera during normal operation.

Prior to establishing secure communication for the electronic device 602, a user registers (702) a user account on a client-side application associated with the electronic device 602, and logs (704) onto the user account. In response to a user action, the client device initializes (706) a device scan process to search for advertising packets that are broadcast by one or more the electronic devices located nearby. In some implementations, the user action for initializing the device scan process is associated with a click on an information item displayed on a provisioning interface 810 (e.g., the "start" item 802). By clicking on the "start" item 802, the user also acknowledges that "I agree to Placement Guidelines" via the same click.

On the device side, the electronic device 602 is powered on (742) and configured to broadcast (744) the advertising packets proactively. In one example, the advertising packets are broadcast regularly based on Bluetooth based technology. The advertising packets at least include a device identifier that is assigned to the electronic device 602 when it is shipped out of factory. Optionally, when the client device 604 is proactively searching for the electronic device 602, a provisioning interface 420 is displayed to indicate that such a device scan process is under way, and remind the user of the client device 604 that the electronic device 602 needs to be placed in proximity to the client device and powered properly.

As a result of the device scan process, the client device receives (708) the advertising packets broadcast by one or more electronic devices. The client device then forwards (710) the device identifiers associated with the one or more electronic devices 602 to the server system 606 in conjunction with other information items (e.g., information concerning the user account, an encryption type and an IP address of the client device). In some implementations, the device identifiers are transferred in an encrypted format, and decrypted in the server system 606 according to the encryption type. Optionally, the encryption type is associated with one of the following encryption standards: Advanced Encryption Standard (AES), Temporal Key Integrity Protocol (TKIP), Wired Equivalent Privacy (WEP), Wi-Fi Protected Access (WPA), Extensible Authentication Protocol (EAP), IEEE8021X, Lightweight EAP (LEAP), WPA2, WPA-PSK, Remote Authentication Dial In User Service (RADIUS) and the like.

Figure 8A:
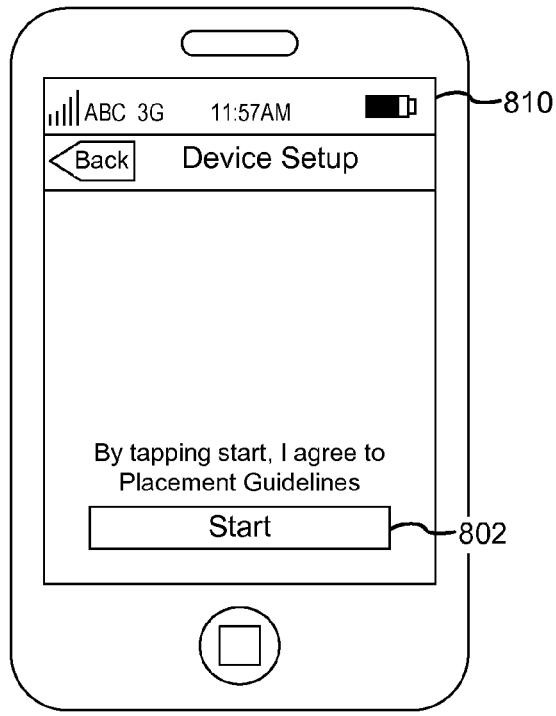
FIGS. 8A-8G are exemplary graphical user interfaces (GUI) that are displayed on an client device during a device provisioning process in accordance with some implementations.
Figure 8B:

After receiving (780) from the client device the device identifiers of the one or more the electronic devices, the server system 606 determines (782) whether each of the one or more the electronic devices has already been linked to any other user account (i.e., each device's availability for provisioning) according to information stored in an account database of the server system 606. In accordance with a determination that each of a subset of the electronic devices (e.g., the electronic device 602) is not linked to any other user account, the server system 606 associates (784) the respective device identifiers with the user account that the client device has been logged onto, and sends (786) a link approval response to the client device to authorize the client device to associate the user account with the subset of the electronic devices. In some implementations, as shown in FIG. 8B, the provisioning interface 820 is displayed at the client device, until the server system 606 generates the link approval response.

Figure 8C:
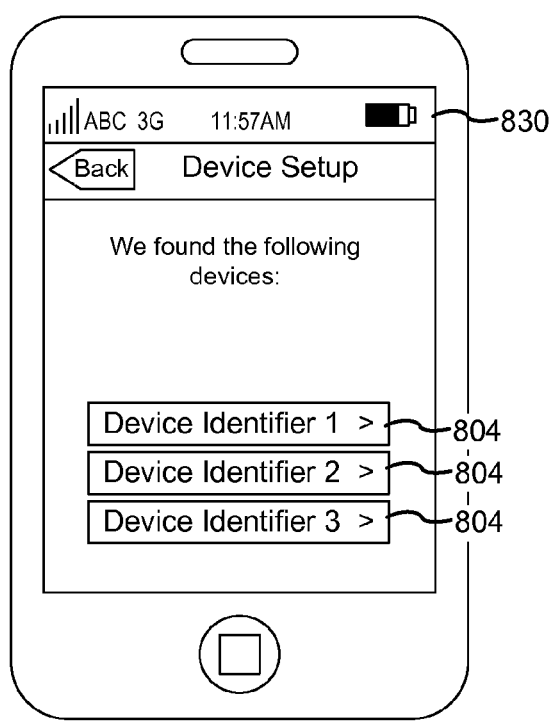

After receiving (712) the link approval response, the client device associates (714) the user account activated on the client device with the subset of the electronic devices according to the link approval response. Specifically, in response to receiving the link approval response, the client device provides a list of the subset of the electronic devices that are available and approved for provisioning. As shown in FIG. 8C, device names 804 of the subset of electronic devices are displayed on a provisioning interface 830 of the client device.

When a user of the client device 604 selects an approved electronic device from the available electronic devices, client device 704 sends (716) a secure network setup request to initiate a secure network setup session for the selected electronic device. In some implementations, the user selects one of the device names 804 associated with the available electronic devices 602 on a provisioning interface 830. In response to the user selection, the selected electronic device 602 receives from the client device 604 the secure network setup request that includes an instruction to provide a list of available secure networks for the selected electronic device. As such, a short range wireless link is established between the selected electronic device 602 and the client device 604.

In some implementations, in accordance with the secure network setup request, the selected electronic device 602 generates (746) a random number and sends (604) the random number to the client device 604. The client device 604 then forwards (718) the random number to the server system 606. In some implementations, the random number is accompanied by an authentication token that is created based on a device specific secret.

Upon receiving (788) the random number, the server system 606 generates (790) an authentication tag and a password word based on the random number. Optionally, the authentication tag and the password word are generated based on both the random number and the device specific secret. For example, an intermediate data item is created by combining the device specific secret, a device identifier, and the random number according to a predetermined data structure. If the combined data item is less than 32 byte long, it is optionally filled with zeros to form the 32-byte intermediate data item. Then, the 32-byte intermediate data item is converted to a tag-key data item based on a cryptographic hash function (e.g., SHA-256). The first and second 16 bytes of the tag-key data item are separated and used as the authentication tag and the password key, respectively. Therefore, in this specific example, both the authentication tag and the password key have the same length of 16 bytes.

The server system 606 sends (792) the authentication tag and the password key to the client device 604. Upon receiving (720) the authentication tag and the password key, the client device 604 further sends (722) the authentication tag to the electronic device 602. The electronic device 602 receives (750) the authentication tag, and validates (752) the authentication tag based on the random number. In some implementations, the authentication tag is generated based on both the random number and the device specific secret in the server system 606, and therefore, has to be verified using both the random number and the device specific secret in the electronic device 602. In an example, the electronic device 602 recreates an authentication tag by combining and converting the device specific secret, a device identifier, and the random number all stored locally in its memory in the same manner as the received authentication tag is created in the server system. When the recreated authentication tag is consistent with the received authentication tag, the validity of the received authentication tag is verified. As such, it is verified that the authentication tag is sent by an authorized party (e.g., the server system 606) and its integrity has been properly maintained during data transmission.

After verifying the authentication tag, the electronic device 602 scans (754) to identify a list of available secure networks (e.g., a Wi-Fi network) that are accessible by the electronic device 602. The electronic device 602 then provides (756) network identifiers of the list of available secure networks to the client device via the short range wireless link between the electronic device 602 and the client device 604.

Figure 8D:
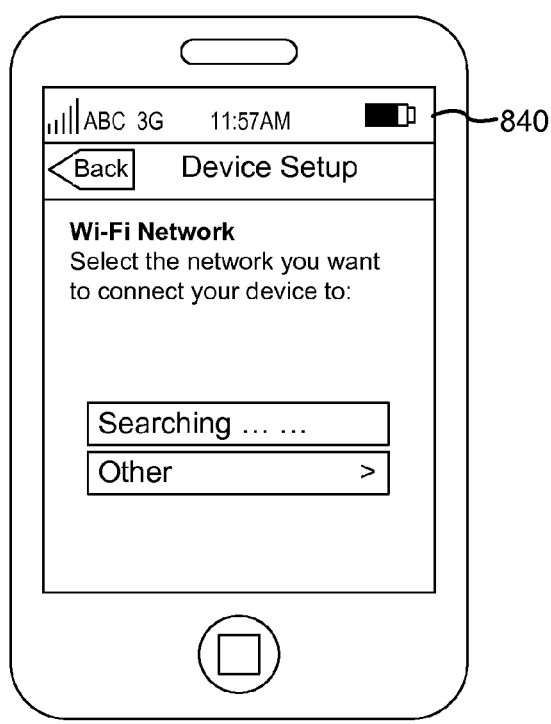
Figure 8E:
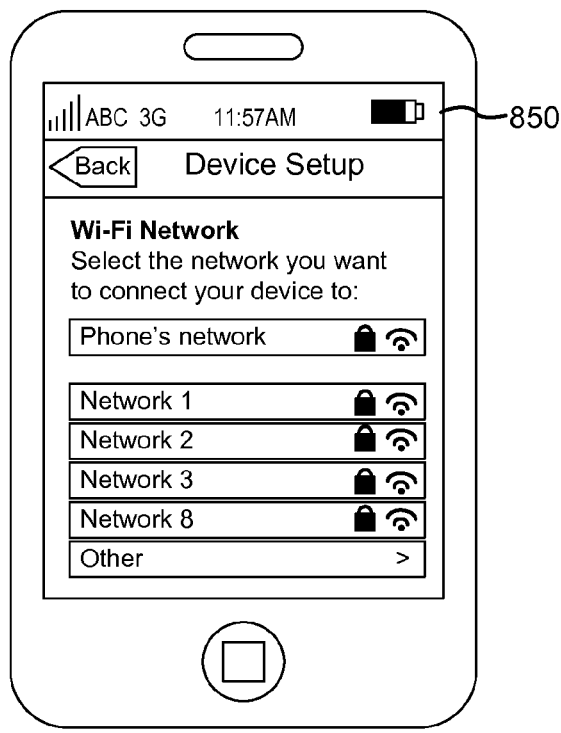

The client device 604 receives (724) the network identifiers of the available secure networks, and determines (726) a preferred secure network among the available secure networks. As shown in FIG. 8D, in some implementations, a provisioning interface 840 is displayed while the electronic device 602 is searching for available secure networks. When the electronic device 602 identifies and provides the list of available secure networks to the client device 604, the list of secure networks are displayed on a provisioning interface 850 in association with the electronic device 602 as shown in FIG. 8E. Optionally, the list of secure networks includes a Phone's network 806 that is used by the client device to communicate with the server system 606. Optionally, the list of secure networks is arranged on the provisioning interface 850 according to signal strengths of the listed secure networks.

Figure 8F:
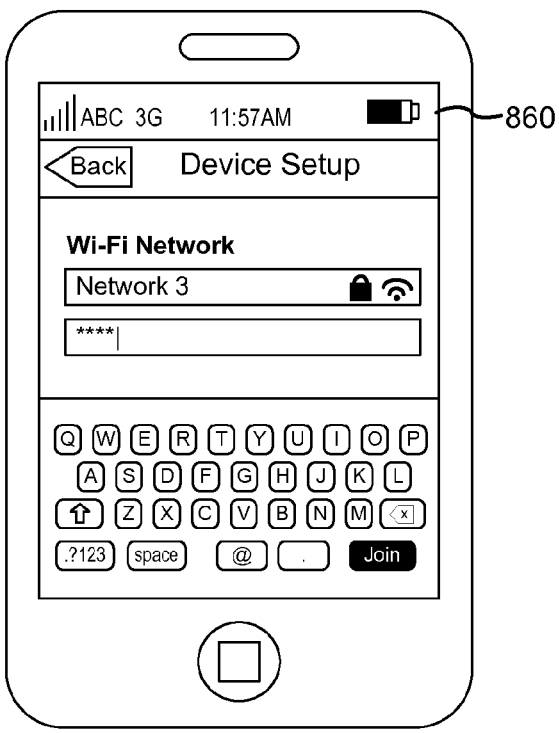

In some implementations, the user then selects a preferred secure network from the list of secure networks by clicking on the corresponding device name displayed on the provisioning interface 850 (as shown in FIG. 8E). This preferred secure network is optionally the first secure network (e.g., the "Phone's network" 806) or another secure network in the list of the secure networks. As shown in FIG. 8F, in response to a user selection of a preferred secure network on the provisioning interface 850, another provisioning interface 860 is displayed to provide a virtual keyboard and allows the user to input network passwords for the preferred secure network. In some situations, the user selects the preferred secure network, and does not need to input the network password because the network password has been entered previously and stored in a local memory of the client device 604.

Then, the client device 604 encrypts (728) network credentials of the preferred secure network using the password key provided by the server system 606. After receiving (758) the encrypted network credentials, the electronic device 602 decrypts (760) the encrypted network credentials of the preferred secure network based on the random number. Specifically, the electronic device 602 recreates the password key from the random number using the same tag-key generation method used by server system to create the password key. In some implementations, the password key is recreated from both the random number and the device specific secret, if the device specific secret is used to create the password key in the server system 606.

Figure 8G:
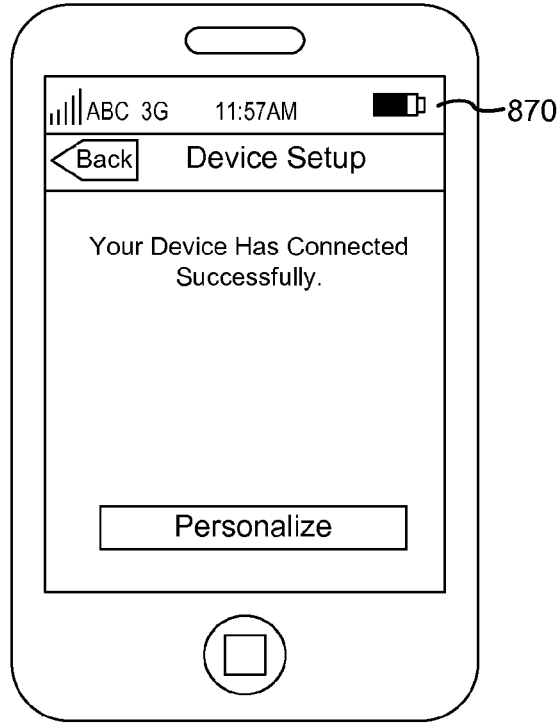

Once the electronic device 602 has recovered the network credentials, it uses the network credentials to communicate (762 and 794) with the server system 606 via the preferred secure network, independently of the client device. As shown in FIG. 8G, in some implementations, a provisioning interface 870 is displayed at client device to notify the user that the electronic device 602 has been successfully connected to the server system 606 via a secure network. In some implementations, the preferred secure network is a secure wireless network.

As explained above, during exemplary device provisioning process 700, user interventions are optionally needed in a limited number of situations, such as starting client-side application associated with electronic devices 602, logging onto a user account, initializing a device provisioning process, selecting one of a set of electronic devices 602 for device provisioning, selecting a preferred secure network, and inputting network credentials. Other than these basic controls, the user does not need to connect the electronic devices to any personal computer (e.g., a laptop or desktop computer) using an electronic wire, nor does the user need to load a separate device provision application that is distinct from the client-side application used in normal operation for device control and data review. As such, the device provisioning operations for the electronic device 602 are simplified from both the hardware and software perspectives, and would improve user experience for most users who may not be sophisticated with handling different types of electronic devices.

Figure 9:
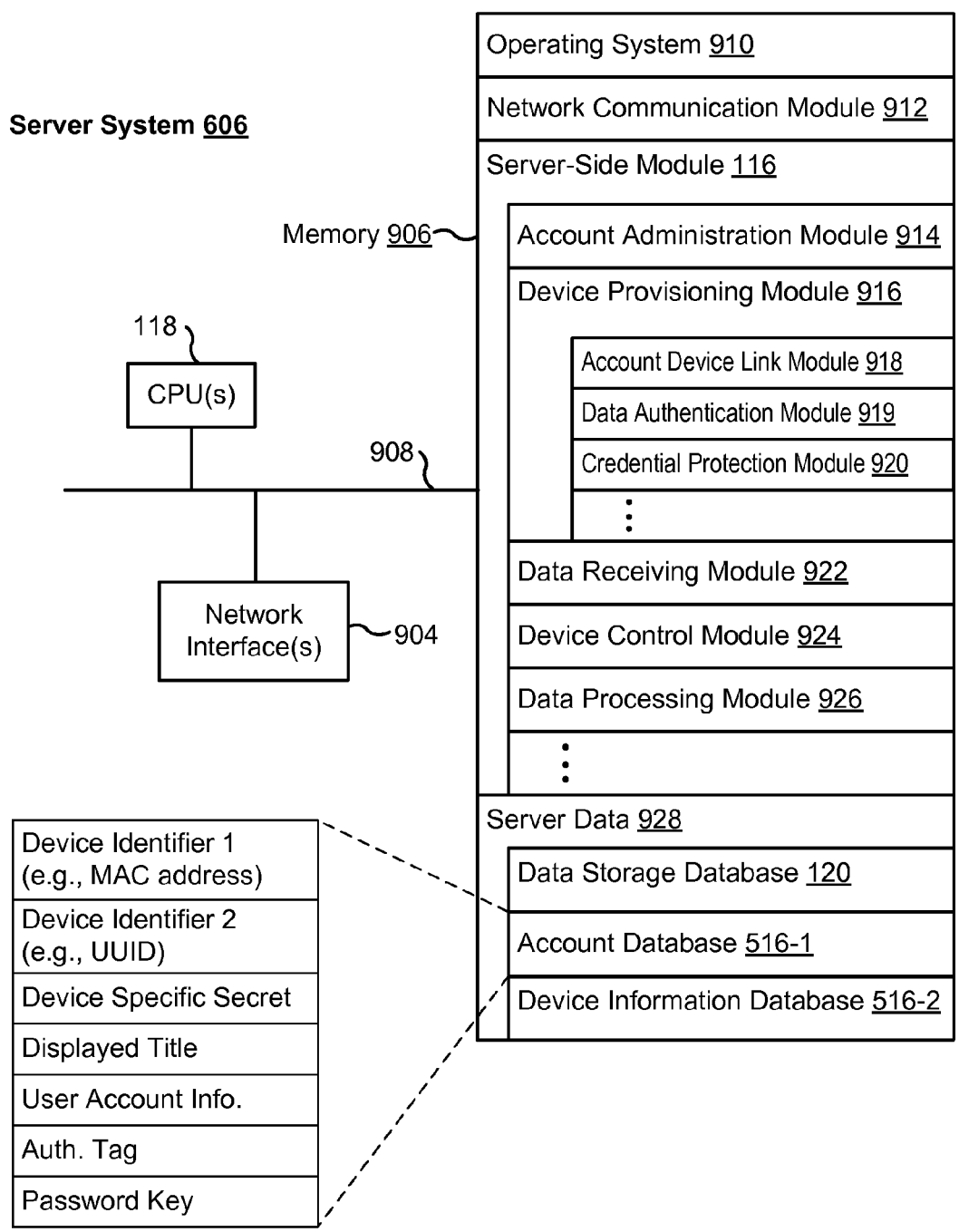
FIG. 9 is a block diagram illustrating server system in accordance with some implementations.

FIG. 9 is a block diagram illustrating the server system 606 in accordance with some implementations. The server system 606, typically, includes one or more processing units (CPUs) 118, one or more network interfaces 904 (e.g., including I/O interface to one or more clients 106 and I/O interface to one or more the electronic devices), memory 116, and one or more communication buses 908 for interconnecting these components (sometimes called a chipset). Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, optionally, includes one or more storage devices remotely located from one or more processing units 118. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

Operating system 910 including procedures for handling various basic system services and for performing hardware dependent tasks;

Network communication module 912 for connecting the server system 606 to other client devices (e.g., the client devices and the electronic devices (including e.g., cameras) connected to one or more networks 162 via one or more network interfaces 904 (wired or wireless);

Server-side module 116, which provides server-side functionalities for account management, device provision, device control, data processing and data review, including but not limited to:

Account administration module 914 for creating user accounts, and providing account login-services to client devices;

Device provisioning module 916 that includes at least an account device link module 918 for performing electronic device registration processing (sometimes in cooperation with the account administration module 914) to establish and approve associations between the electronic devices to their respective user accounts, a data authentication module 919 for authenticating and validating data received from electronic devices based on an authentication token accompanying the received data, and a credential protection module 920 for generating an authentication tag and a password key that are used to authorize a secure network scan and encrypt network credentials, respectively;

Data receiving module 922 for receiving raw data (e.g., video data) from electronic devices, and preparing the received data for further processing and long-term storage in the data storage database 120;

Device control module 106 for generating and sending server-initiated control commands to modify operation modes of the electronic devices, and/or receiving and forwarding user-initiated control commands to modify operation modes of the electronic devices;

Data processing module 926 for processing the raw data provided by the electronic devices such that the processed data could be forwarded to a client device and reviewed by a user who logs onto a corresponding user account on the specific client device; and server data 936 storing data for use in account management, device provision and control, data processing and data review, including but not limited to:

Data storage database 120 for storing raw data associated with each electronic device 1002 (e.g., each camera) of each user account, as well as data processing models, processed data results, and other relevant metadata (e.g., names of data results, location of electronic device 1002, creation time, duration, settings of the electronic device 1002, etc.) associated with the raw data;

Account database 516-1 for storing account information for user accounts, including user account information, information for associated electronic devices, authentication tags, password keys, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and Device Information Database 516-2 for storing device information related to one or more electronic devices, e.g., device identifiers and device specific secrets, independently of whether the corresponding electronic devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 116, optionally, stores a subset of the modules and data structures identified above. Furthermore, memory 116, optionally, stores additional modules and data structures not described above.

Figure 10:
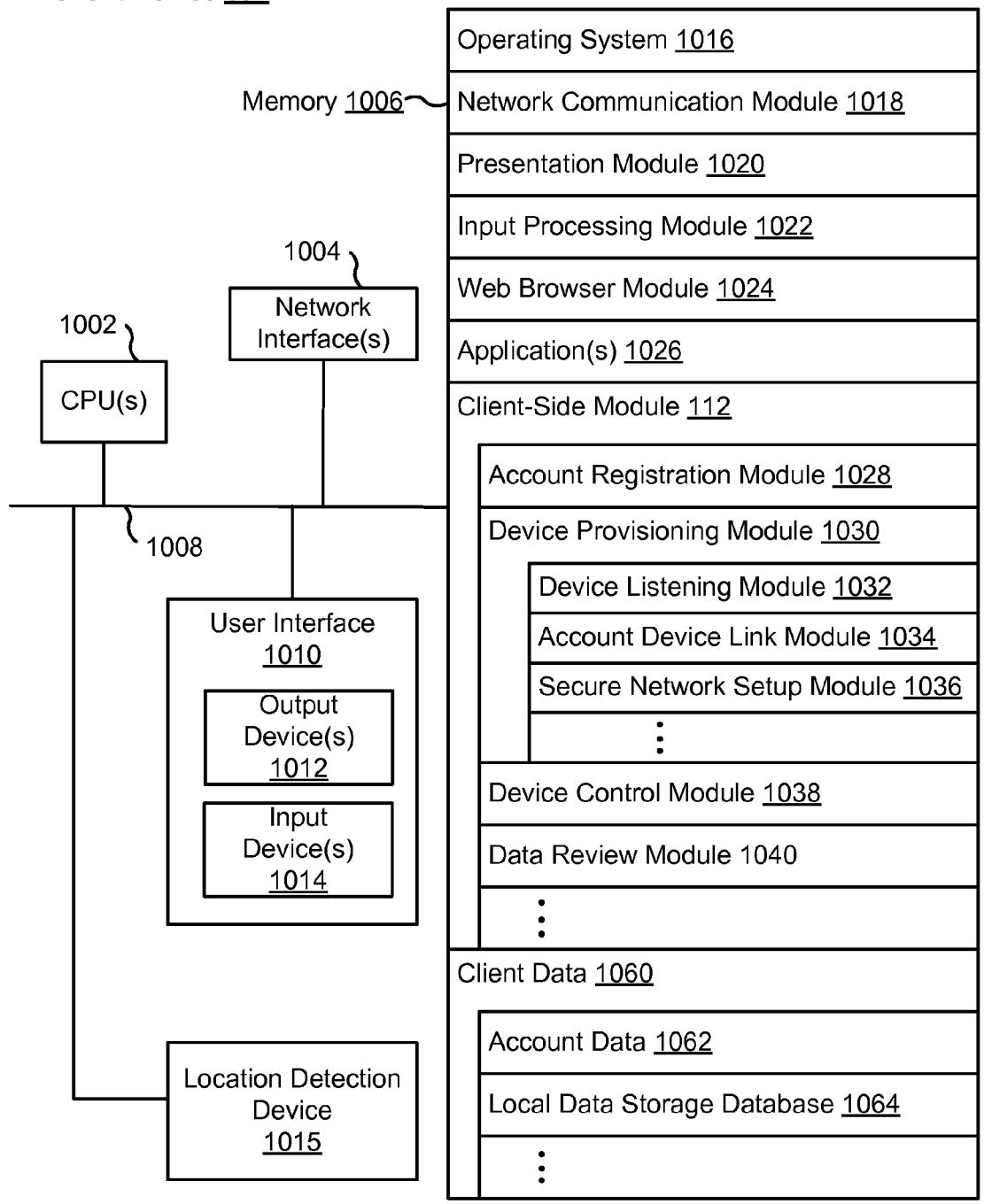
FIG. 10 is a block diagram illustrating a representative client device associated with a user account in accordance with some implementations.

FIG. 10 is a block diagram illustrating a representative client device 604 associated with a user account in accordance with some implementations. The client device 604, typically, includes one or more processing units (CPUs) 1002, one or more network interfaces 1004, memory 1006, and one or more communication buses 1008 for interconnecting these components (sometimes called a chipset). The client device also includes a user interface 1010. User interface 1010 includes one or more output devices 1012 that enable presentation of media content, including one or more speakers and/or one or more visual displays. User interface 1010 also includes one or more input devices 1014, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images, for example, of graphic series codes printed on the electronic devices. Optionally, the client device includes a location detection device 1015, such as a GPS (global positioning satellite) or other geo-location receiver, for determining the location of the client device.

Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1016 including procedures for handling various basic system services and for performing hardware dependent tasks;

Network communication module 1018 for connecting the client device to other client devices (e.g., server system 1006 and the electronic devices) connected to one or more networks 162 via one or more network interfaces 1004 (wired or wireless);

Presentation module 1020 for enabling presentation of information (e.g., a graphical user interface for presenting application(s) 1026 or the client-side module 112, widgets, websites and web pages thereof, and/or games, audio and/or video content, text, etc.) at the client device via one or more output devices 1012 (e.g., displays, speakers, etc.) associated with user interface 1010;

Input processing module 1022 for detecting one or more user inputs or interactions from one of the one or more input devices 1014 and interpreting the detected input or interaction;

Web browser module 1024 for navigating, requesting (e.g., via HTTP), and displaying websites and web pages thereof, including a web interface for logging into a user account, controlling the electronic devices associated with the user account, and editing and reviewing data that are captured by the electronic devices and optionally processed by server system 1006;

One or more applications 1026 for execution by the client device (e.g., games, social network applications, smart home applications, and/or other web or non-web based applications for controlling electronic devices and reviewing data captured by the electronic devices);

Client-side module 112, which provides client-side functionalities for device provisioning, device control, data processing and data review, including but not limited to:

Account registration module 1028 for establishing a user account;

Device provisioning module 1030 that provisions electronic devices (sometimes in cooperation with the account registration module 1028) and includes at least a device listening module 1032 for receiving advertisement packets broadcast by the electronic device 602 during a device scan process, an account device link module 1034 for associating one or more electronic devices 602 with a corresponding user account and enabling short range wireless links with associated electronic devices 602, and a secure network setup module 1036 for providing network credentials of a secure network in a secure manner and enabling the electronic device to communicate with remote server system 1006 through the secure network;

Device control module 1038 for generating control commands for modifying an operating mode of the one or more the electronic devices in accordance with user input; and Data review module 1040 for providing user interfaces for reviewing the data that are processed by server system 1006 and displayed on the display of the client device; and client data 1060 storing data associated with the user account and electronic devices, including, but is not limited to:

Account data 1062 storing information related with both user accounts loaded on the client device 604 and electronic devices 602 associated with the user accounts, wherein such information includes cached login credentials, electronic device identifiers (e.g., MAC addresses and UUIDs), user interface settings, display preferences, authentication tokens and tags, password keys, etc.; and Local data storage database 1064 for selectively storing raw or processed data associated with electronic devices 602 (e.g., a camera) that has been linked to the user accounts.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

In some implementations, at least some of the functions of the server system 606 are performed by the client device 604, and the corresponding sub-modules of these functions may be located within the client device rather than server system 606. In some implementations, at least some of the functions of the client device are performed by the server system 606, and the corresponding sub-modules of these functions may be located within the server system 606 rather than client device 604. The client device 604 and the server system 606 shown in FIGS. 9 and 10, respectively, are merely illustrative, and different configurations of the modules for implementing the functions described herein are possible in various implementations.

Figure 11:
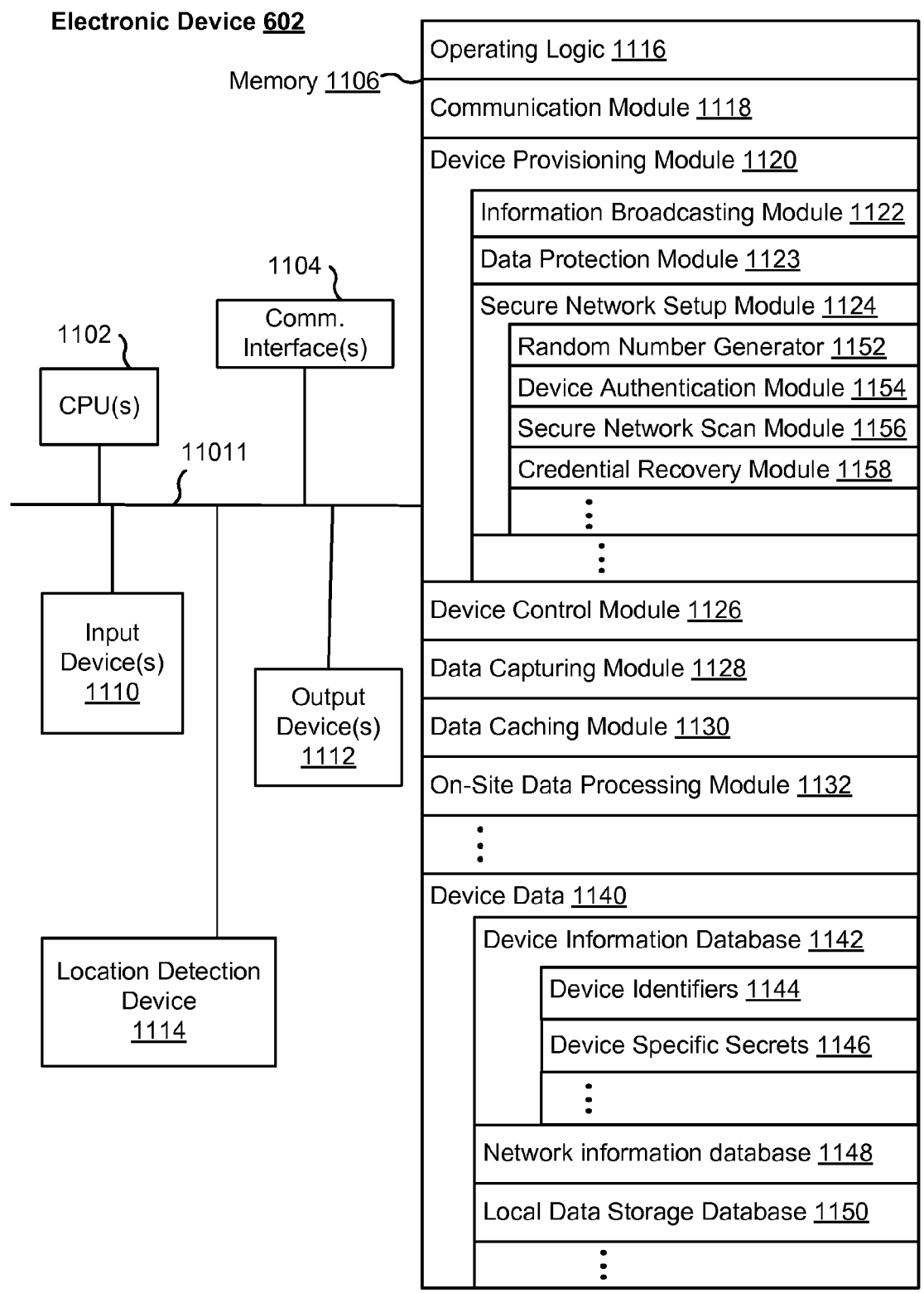
FIG. 11 is a block diagram illustrating a representative electronic device in accordance with some implementations.
Figure 12A:
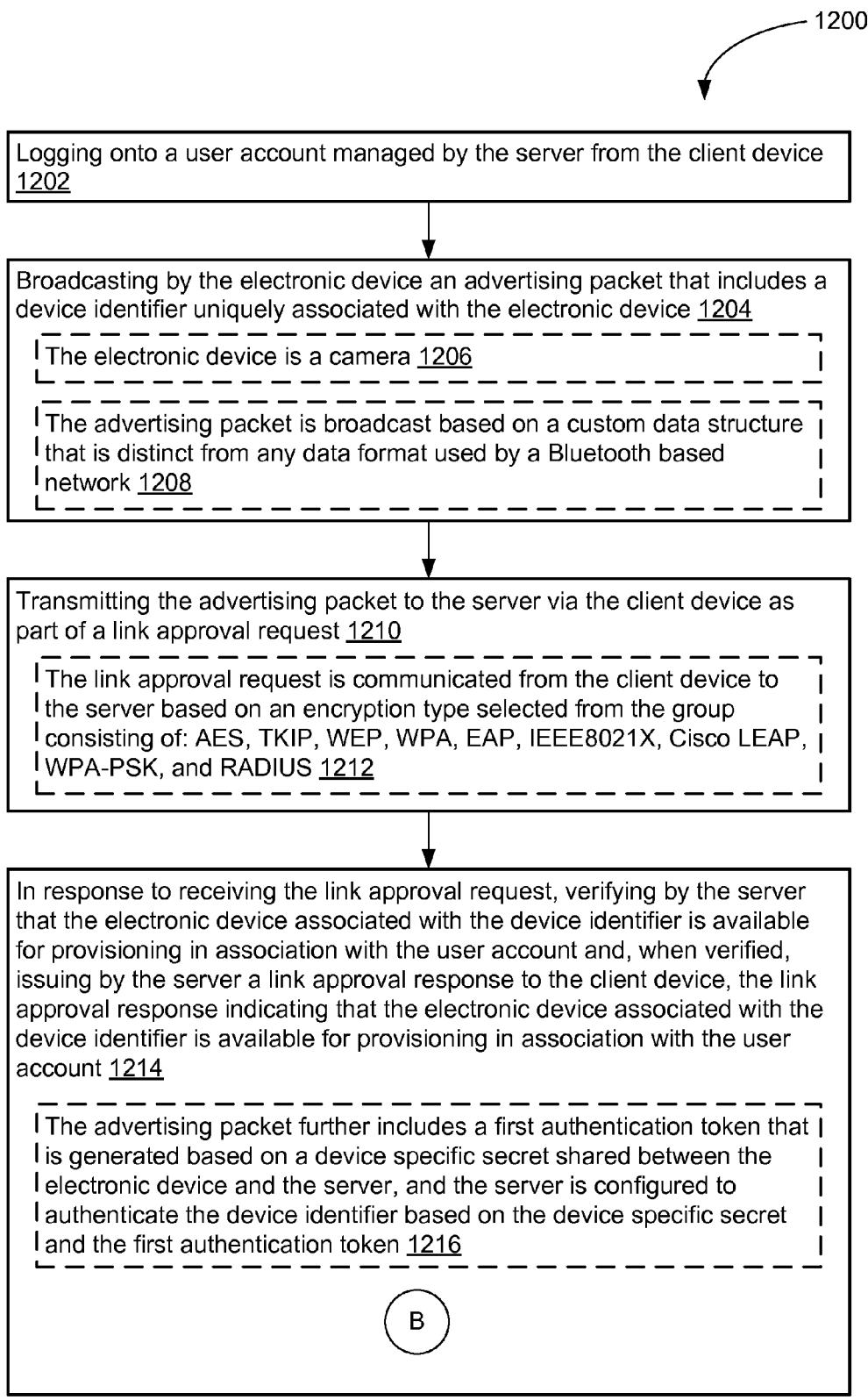
Figure 12B:
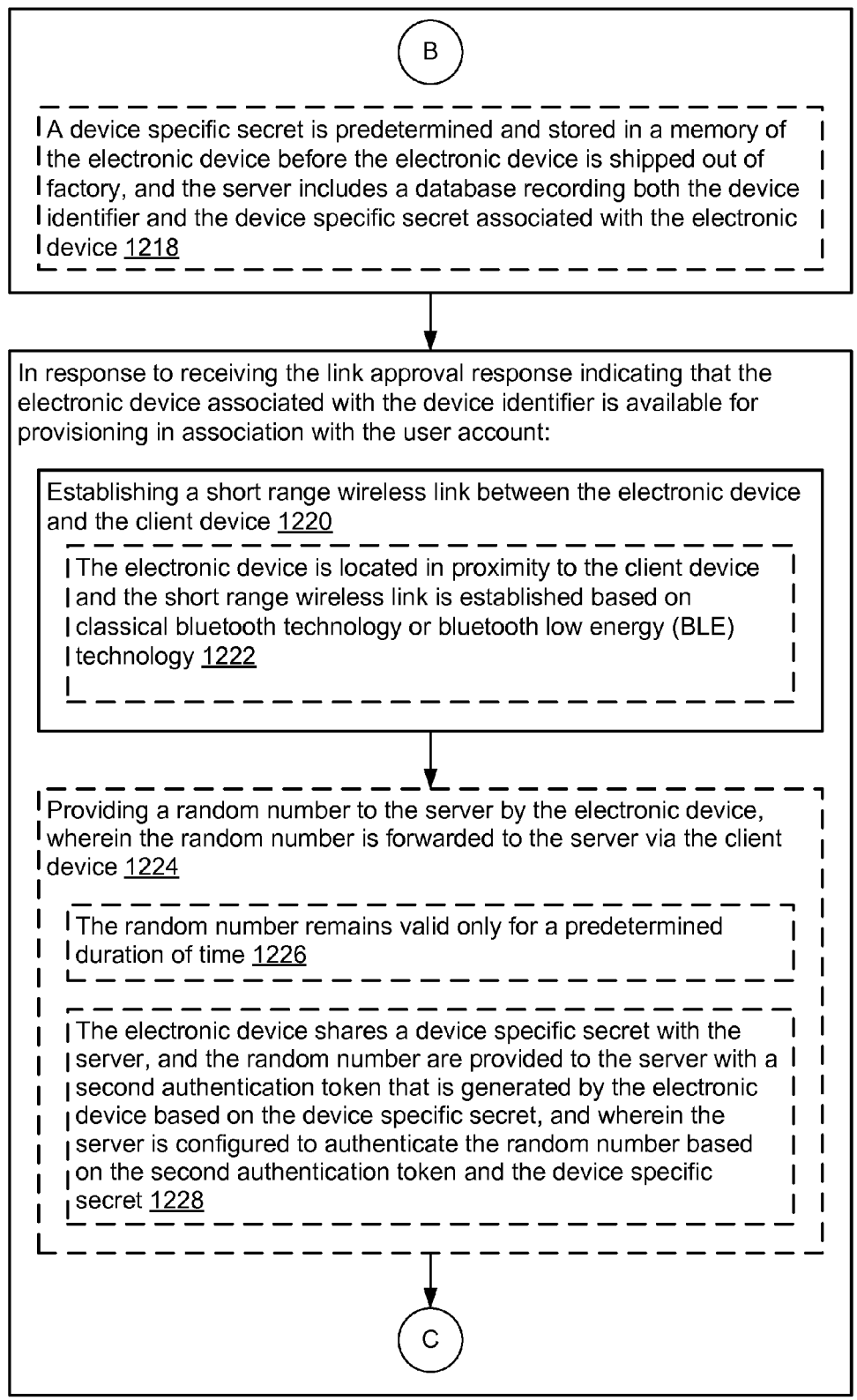

FIG. 11 is a block diagram illustrating a representative electronic device 602 in accordance with some implementations. In some implementations, the electronic device 602 includes one or more processing units (e.g., CPUs, ASICs, FPGAs, microprocessors, and the like) 1102, one or more communication interfaces 1104, memory 1106, and one or more communication buses 1108 for interconnecting these components (sometimes called a chipset). In some implementations, the electronic device 602 includes one or more input devices 1110 such as one or more buttons for receiving input. In some implementations, the electronic device 602 includes one or more output devices 1112 such as one or more indicator lights, a sound card, a speaker, a small display for displaying textual information and error codes, etc. Furthermore, some the electronic device 602 uses a microphone and voice recognition or a camera and gesture recognition to supplement or replace the keyboard. In some implementations, the electronic device 602 includes a location detection device 1114, such as a GPS (global positioning satellite) or other geo-location receiver, for determining the location of the electronic device 602.

Memory 1106 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1106, or alternatively the non-volatile memory within memory 1106, includes a non-transitory computer readable storage medium. In some implementations, memory 1106, or the non-transitory computer readable storage medium of memory 1106, stores the following programs, modules, and data structures, or a subset or superset thereof:

Operating system 1116 including procedures for handling various basic system services and for performing hardware dependent tasks;

Network communication module 1118 for connecting the electronic device 602 to other client devices (e.g., the server system 606, the client device, network routing devices, one or more controller devices, and networked storage devices) connected to one or more networks 162 via one or more communication interfaces 1104 (wired or wireless);

Device provisioning module 1120 that sets up the electronic devices and includes at least an information broadcasting module 1122 for broadcasting a device identifier of the electronic devices, a data protection module 723 for protecting data using a device specific secret before transferring the data out of the electronic device 602, and a secure network setup module 1124 for verifying an authentication tag issued by the server system 606 and recovering network credentials encrypted by a password key for the purposes of enabling the electronic device 602 to communicate with the server system 606 through a corresponding secure network;

Device control module 1126 for modifying the electronic device's operation mode;

Data capturing module 1128 for capturing and generating data streams and sending the data stream to the server system 606 as a continuous feed or in short bursts;

Data caching module 1130 for storing some or all captured video data locally at one or more local storage devices (e.g., memory, flash drives, internal hard disks, portable disks, etc.)

Local data processing module 1132 for performing preliminary processing of the captured data locally at the electronic device; and Device data 1140 storing data, including but not limited to:
Device information database 1142, including one or more device identifiers 1144, one or more device specific secrets 1146, etc.;

Network information database 1148, including network identifiers and network credentials for one or more secure networks, etc., and Local data storage database 1150, including raw data recorded by the electronic device 106 (e.g., raw camera video) or some data that have been preliminarily processed by local data processing module 1132 (e.g., to identify activity recorded by the camera that is of potential interest).

In some implementations, the secure network setup module 724 further includes a random number generator 1152, a device authentication module 1154, a secure network scan module 1156, and a credential recovery module 1158. The random number generator 1152 generates a random number. Optionally, the data protection module 1123 generates an authentication token by combining the random number and the device specific secret. The random number is provided to server system together with the corresponding authentication token. The server system 606 returns the authentication tag generated based on the random number.

In some implementations, the device authentication module 1154 verifies the validity of the authentication tag by recreating another authentication tag and comparing the received and recreated authentication tags. In accordance with a verification of the authentication tag, secure network scan module 1156 implements a secure network scan to identify a list of available secure networks that are accessible by the electronic device 602. A preferred secure network (e.g., a secure wireless network) is selected from the list of available secure networks, and its network credentials are provided to the electronic device 602 in an encrypted format. Then, the credential recovery module 1158 recreates the password key in the same manner as it is created by server system 606, and recovers the network credentials of the preferred secure network using the recreated password key. As such, the electronic device 602 is enabled to communication with the server system 606 via the preferred secure network using the recovered network credentials.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1106, optionally, stores a subset of the modules and data structures identified above. Furthermore, memory 1106, optionally, stores additional modules and data structures not described above.

FIGS. 12A-12D are flow diagrams illustrating an exemplary method 1200 of provisioning an electronic device in accordance with some implementations. Specifically, the electronic device is provisioned to communicate with a server via a secure network. Method 1200 is, optionally, governed by instructions that are stored in a non-transitory computer readable storage medium and that are executed by one or more processors of an electronic device, a client device and/or a server system. Each of the operations shown in FIGS. 12A-12D may correspond to instructions stored in a computer memory or non-transitory computer readable storage medium (e.g., memory 906, 1006 or 1106). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the provisioning method 1200 may be combined and/or the order of some operations may be changed. In addition, as described with reference to FIGS. 13, 14 and 15, different implementations may perform only a portion of the operations associated with the provisioning method 1200. For example, different implementations may solely perform operations associated with an electronic device (e.g., a security camera), a client device, or a server in order to connect to and/or interact with a device provisioning framework that is compatible with that described herein. For example, a surveillance camera from a first manufacturer might implement one or more operations described in the method 1200 as being performed by the camera 602, and employ one or more of the specific message formats described herein, to enable that camera to be associated with and monitored in conjunction with a user account provided and maintained by an independent security monitoring service that operates its own surveillance monitoring servers. In some implementations, operations of the method 1200 are performed by one or more of the program modules described in FIGS. 9, 10 and 11, including one or more of the account provisioning module 914 and device provisioning module 918 of the server 606; the account registration module 1028 and device provisioning module 1030 of the client device 604; and the information broadcasting module 1122, data protection module 1123 and secure network setup module 1124 of the electronic device 602.

In accordance with device provisioning method 1200, a user logs (1202) onto a user account managed by the server from the client device. The electronic device broadcasts (1204) an advertising packet that includes a device identifier uniquely associated with the electronic device. In some implementations, the electronic device is (1206) a camera. In some implementations, the advertising packet is (1208) broadcast based on a custom data structure that is distinct from any data format used by a Bluetooth based network 1208.

The client device then transmits (1210) the advertising packet to the server as part of a link approval request. In some implementations, the link approval request is communicated (1212) from the client device to the server based on an encryption type selected from the group consisting of: AES, TKIP, WEP, WPA, EAP, IEEE8021X, Cisco LEAP, WPA-PSK, and RADIUS.

In response to receiving the link approval request, the server verifies (1214) that the electronic device associated with the device identifier is available for provisioning in association with the user account. When the availability of the electronic device is verified, the server issues a link approval response to the client device, and this link approval response indicates that the electronic device associated with the device identifier is available for provisioning in association with the user account.

In some implementations, the advertising packet forwarded by the client device to the server further includes (1216) a first authentication token that is generated based on a device specific secret shared between the electronic device and the server. The server is configured to authenticate the device identifier based on the device specific secret and the first authentication token before it verifies the availability of the electronic device based on the device identifier. Further, in some implementations, a device specific secret is predetermined and stored (1218) in a memory of the electronic device before the electronic device is shipped out of factory, and the server includes a database recording both the device identifier and the device specific secret associated with the electronic device.

In response to receiving the link approval response, the electronic device and the client device establish (1220) communication via a short range wireless link. In some implementations, the electronic device is located (1222) in proximity to the client device, and the short range wireless link is established based on classical Bluetooth technology or Bluetooth low energy (BLE) technology.

In some implementations, in response to receiving the link approval response, the client device provides (1224) a random number to the server, and the random number is forwarded to the server via the client device. Further, in some implementations, the random number remains (1226) valid only for a predetermined duration of time (e.g., 15 minutes). In some implementations, the electronic device shares a device specific secret with the server, and the random number are provided (1228) to the server with a second authentication token that is generated by the electronic device based on the device specific secret, and wherein the server is configured to authenticate the random number based on the second authentication token and the device specific secret.

In some implementations, after receiving the random number, the server generates (1230) an authentication tag and a password key by the server based on the random number. Optionally, the password key is encrypted (1232) by the server based on both the random number and a device secret known to the server and the electronic device. The server then forwards (1234) the authentication tag to the electronic device via the client device, and the electronic device verifies the authentication tag based on the random number. Here, the random number and the authentication tag are communicated (1236) between the electronic device and the client device via the short range wireless link.

In some implementations, after a verification of the authentication tag, the electronic device identifies (1238) a list of available secure networks in a secure network scan, and provides (1240) the list of available secure networks to the client device. The client device is configured to determine a secure wireless network from the list of available secure networks. In some implementations, the client device determines (1242) the secure wireless network from the list of available secure networks, by displaying the list of available secure networks on a provisioning interface displayed on the client device and receiving a user selection of the secure wireless network.

After determining the secure wireless network, the client device obtains (1244) network credentials for accessing the secure wireless network. In some implementations, the secure wireless network includes (1246) a wireless local area network (WLAN), and the network credentials of the secure wireless network further include (1248) at least a service set identifier (SSID) and a network password for the WLAN.

The client device encrypts (1250) at least a portion of the network credentials using a password key generated at the server and communicated from the server to the client device. As explained above, in some implementations, the password key is generated in conjunction with the authentication tag based on a random number provided by the electronic device. In that situation, the client device encrypts (1234) the at least a portion of the network credentials using the password key only when the electronic device verifies the authentication tag. The encrypted network credentials are optionally communicated (1236) between the electronic device and the client device via the short range wireless link.

In some implementations, the network credentials of the secure wireless network include a network password, and the client device receives (1252) a user input of the network password and encrypts the network password using the password key provided by the server.

After encrypting the at least a portion of the network credentials, the client device sends (1254) the encrypted network credentials to the electronic device over the short range wireless link. The electronic device obtains (1256) decrypted network credentials by decrypting the encrypted network credentials using a key generated at the electronic device. Then, the electronic device accesses (1258) the secure wireless network using the decrypted network credentials.

In some implementations, during the course of provisioning the electronic device, the client device communicates (1260) with the server system at least partially via the secure wireless network that is selected to enable the communication between the electronic device and the server. An example of such a secure network is a WiFi network covering both the client device and the electronic device. Alternatively, in some implementations, the client device communicates (1246) with the server independently of the secure wireless network that is selected to enable the communication between the electronic device and the server. For example, the secure wireless network includes a WiFi network that covers the electronic device and ultimately enables its communication with the server system. However, the client device communicates with the server via a cellular network that is distinct and independent from the WiFi network.

It should be understood that the particular order in which the operations in FIGS. 12A-12D are shown and have been described is merely exemplary and is not intended to indicate that the described order is the only order in which the operations could be performed. One of ordinary skill in the art would recognize various ways to cache and distribute specific data as described herein. Additionally, it should be noted that details of other processes described herein with respect to method 1200 (e.g., FIGS. 12A-12D) are also applicable in an analogous manner to methods 1300, 1400 and 1500 described above with respect to FIGS. 13, 14 and 15, respectively. For brevity, these details are not repeated here.

FIG. 13 is a flow diagram illustrating an exemplary method 1300 that is implemented by an electronic device to provision the electronic device in accordance with some implementations. Specifically, the electronic device is provisioned to communicate with a server via a secure network. Method 1300 is, optionally, governed by instructions that are stored in a non-transitory computer readable storage medium and that are executed by one or more processors of an electronic device (e.g., the electronic device 602). Each of the operations shown in FIG. 13 may correspond to instructions stored in a computer memory or non-transitory computer readable storage medium (e.g., memory 1106 in FIG. 11). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1300 may be combined and/or the order of some operations may be changed.

In some implementations, method 1200 is implemented on the electronic device to set up a secure network for the electronic device automatically and without user intervention. The electronic device is located in proximity to a client device and shares a device specific secret with a server. The electronic device proactively broadcasts (1302) advertising packets that include a device identifier uniquely associated with the electronic device. In accordance with a link approval response that is generated by the server to verify that the device identifier of the electronic device is not associated with any user account, the electronic device establishes (1304) communication with the client device via a short range wireless link.

The electronic device then establishes communication with the server via a secure network by a series of operations. Specifically, the electronic device provides (1306) a random number to the server via the client device, and verifies (1306) an authentication tag that is generated by the server based on the random number and forwarded to the electronic device by the client device. In accordance with the verification of the authentication tag, the electronic device obtains (1308) encrypted network credentials of a preferred secure network. Network credentials of the preferred secure network are encrypted in the client device using a password key generated by the server based on the random number. The electronic device recovers (1310) the network credentials of the preferred secure network using the password key recreated from the random number, and uses (1312) the recovered network credentials to communicate with the server via the preferred secure network, independently from the client device.

More details of each operation in method 1300 are discussed above with reference to FIGS. 6-12.

It should be understood that the particular order in which the operations in FIG. 13 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 1300 (e.g., FIG. 13) are also applicable in an analogous manner to method 1200, 1400 and 1500 described above with respect to FIGS. 12A-12D, 14 and 15, respectively. For brevity, these details are not repeated here.

FIG. 14 is a flow diagram illustrating an exemplary method 1300 that is implemented by a client device to provision an electronic device in accordance with some implementations. Specifically, the electronic device is provisioned to communicate with a server via a secure network. Method 1400 is, optionally, governed by instructions that are stored in a non-transitory computer readable storage medium and that are executed by one or more processors of a client device (e.g., the client device 604). Each of the operations shown in FIG. 14 may correspond to instructions stored in a computer memory or non-transitory computer readable storage medium (e.g., memory 1006 in FIG. 10). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1400 may be combined and/or the order of some operations may be changed.

In some implementations, method 1400 is implemented on a client device to set up a secure network for the electronic device. The client device creates and logs onto (1402) a user account managed by a server system. Then, the client device associates (1404) the user account with an electronic device by (1) forwarding to the server a device identifier that is uniquely associated with the electronic device, and (2) receiving, from the server, a link approval response that verifies that the electronic device is not associated with any user account. The electronic device is located in proximity to the client device, and the device identifier is received in advertising packets proactively broadcast by the electronic device.

After receiving the link approval response, the client device establishes communication via a secure network for the electronic device and the server by a series of operations. Specifically, the client device forwards (1406) a random number to the server, and the random number is provided to by the electronic device. The client device then receives (1408), from the server, payload data that include an authentication tag and a password key both generated based on the random number.

After a verification of the authentication tag by the electronic device, the client device provides (1410) encrypted network credentials of a preferred secure network to the electronic device, and network credentials of the preferred secure network are encrypted using a password key generated by the server based on the random number. The client device sends (1412) the encrypted network credentials to the electronic device. The electronic device is configured to recreate the password key from the random number, recover the network credentials of the preferred secure network using the password key, and apply the recovered network credentials to communicate with the server via the preferred secure network, independently from the client device.

More details of each operation in method 1400 are discussed above with reference to FIGS. 6-12.

It should be understood that the particular order in which the operations in FIG. 13 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 1400 (e.g., FIG. 14) are also applicable in an analogous manner to method 1200, 1300 and 1500 described above with respect to FIGS. 12A-12D, 13 and 15, respectively. For brevity, these details are not repeated here.

FIG. 15 is a flow diagram illustrating an exemplary method 1300 that is implemented by a server system to provision an electronic device in accordance with some implementations. Specifically, the electronic device is provisioned to communicate with a server via a secure network. Method 1500 is, optionally, governed by instructions that are stored in a non-transitory computer readable storage medium and that are executed by one or more processors of a server system (e.g., the server system 606). Each of the operations shown in FIG. 15 may correspond to instructions stored in a computer memory or non-transitory computer readable storage medium (e.g., memory 906 in FIG. 9). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1500 may be combined and/or the order of some operations may be changed.

In some implementations, method 1500 is implemented on the server system to set up a secure network for the electronic device. The server enables (1502) a client device to log onto a user account managed by the server. Then, the server system associates (1504) the user account with the electronic device by (1) receiving, via a client device, a device identifier that is uniquely associated with the electronic device, and (2) generating a link approval response that verifies that the electronic device is not associated with any user account. The electronic device is located in proximity to the client device, and the device identifier is received by the client device in advertising packets proactively broadcast by the electronic device.

Further, the server system establishes communication with the electronic device via a secure network by a series of operations. The server system receives (1506) a random number from the electronic device via the client device, and generates (1508) payload data based on the random number, wherein the payload data include an authentication tag and a password key.

The server system then provides (1510) the authentication tag and the password key to the client device. The client device is configured to encrypt network credentials of a preferred secure network using the password key after a verification of the authentication tag by the electronic device, and the electronic device is configured to recreate the password key from the random number and recover the network credentials of the preferred secure network using the password key.

After the electronic device obtains the network credentials for the preferred secure network, the server system communicates (1512) with the electronic device via the preferred secure network based on the recovered network credentials, independently from the client device.

More details of each operation in method 1500 are discussed above with reference to FIGS. 6-12.

It should be understood that the particular order in which the operations in FIG. 15 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 1500 (e.g., FIG. 15) are also applicable in an analogous manner to method 1200, 1300 and 1400 described above with respect to FIGS. 12A-12D, 13 and 14, respectively. For brevity, these details are not repeated here.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A device provisioning method executed by an electronic device, a client device and a server, comprising:
    logging onto a user account managed by the server from the client device;
    broadcasting by the electronic device an advertising packet that includes a device identifier uniquely associated with the electronic device;
    transmitting the advertising packet to the server via the client device as part of a link approval request;
    in response to receiving the link approval request, verifying by the server that the electronic device associated with the device identifier is available for provisioning in association with the user account and, when verified, issuing by the server a link approval response to the client device, the link approval response indicating that the electronic device associated with the device identifier is available for provisioning in association with the user account;
    in response to receiving the link approval response indicating that the electronic device associated with the device identifier is available for provisioning in association with the user account:
        establishing a short range wireless link between the electronic device and the client device;
        obtaining, at the client device, network credentials for accessing a secure wireless network;
        encrypting, at the client device, at least a portion of the network credentials using a password key generated at the server and communicated from the server to the client device;
        sending the encrypted network credentials from the client device to the electronic device over the short range wireless link;
        obtaining, at the electronic device, decrypted network credentials by decrypting the encrypted network credentials using a key generated at the electronic device; and
        accessing, by the electronic device, the secure wireless network using the decrypted network credentials.

2. The method of claim 1, wherein the electronic device is a camera.

3. The method of claim 1, wherein the advertising packet is broadcast using a custom data structure that is distinct from any standard data format used by a Bluetooth link.

4. The method of claim 1, wherein the electronic device is located in proximity to the client device and the short range wireless link is established based on classical Bluetooth technology or Bluetooth low energy (BLE) technology.

5. The method of claim 1, wherein the advertising packet further includes a first authentication token that is generated based on a device specific secret shared between the electronic device and the server, and the server is configured to authenticate the device identifier based on the device specific secret and the first authentication token.

6. The method of claim 1, wherein a device specific secret is predetermined and stored in a memory of the electronic device before the electronic device is shipped out of factory, and the server includes a database recording both the device identifier and the device specific secret associated with the electronic device.

7. The method of claim 1, further comprising:
    in response to receiving the link approval response:
        providing a random number to the server by the electronic device, wherein the random number is forwarded to the server via the client device;
        generating an authentication tag and the password key by the server based on the random number; and
        forwarding the authentication tag to the electronic device via the client device, wherein the electronic device verifies the authentication tag based on the random number, wherein the client device encrypts the at least a portion of the network credentials using the password key only when the electronic device verifies the authentication tag.

8. The method of claim 7, wherein the password key is encrypted by the server based on both the random number and a device secret known to the server and the electronic device.

9. The method of claim 7, wherein the random number remains valid only for a predetermined duration of time.

10. The method of claim 7, wherein the electronic device shares a device specific secret with the server, and the random number are provided to the server with a second authentication token that is generated by the electronic device based on the device specific secret, and wherein the server is configured to authenticate the random number based on the second authentication token and the device specific secret.

11. The method of claim 7, wherein the random number, the authentication tag and the encrypted network credentials are communicated between the electronic device and the client device via the short range wireless link.

12. The method of claim 1, further comprising:
identifying by the electronic device a list of available secure networks in a secure network scan; and
providing the list of available secure networks to the client device, wherein the client device is configured to determine the secure wireless network from the list of available secure networks.

13. The method of claim 12, wherein the client device determines the secure wireless network from the list of available secure networks, by displaying the list of available secure networks on a provisioning interface displayed on the client device and receiving a user selection of the secure wireless network.

14. The method of claim 1, wherein the network credentials of the secure wireless network include a network password, further comprising: receiving, by the client device, a user input of the network password and encoding the network password using the password key provided by the server.

15. The method of claim 1, wherein the secure wireless network includes a wireless local area network (WLAN).

16. The method of claim 15, wherein the network credentials of the secure wireless network further include at least a service set identifier (SSID) and a network password for the WLAN.

17. The method of claim 1, wherein the link approval request is communicated from the client device to the server based on an encryption type selected from the group consisting of: AES, TKIP, WEP, WPA, EAP, IEEE8021X, Cisco LEAP, WPA-PSK, and RADIUS.

18. The method of claim 1, wherein the client device communicates with the server at least partially via the secure wireless network.

19. The method of claim 1, wherein the client device communicates with the server independently of the secure wireless network.

20. A computer system, comprising:
one or more processors; and
memory having instructions stored thereon, which when executed by the one or more processors cause the processors to perform operations, comprising:
logging onto a user account managed by the server from the client device;
broadcasting by the electronic device an advertising packet that includes a device identifier uniquely associated with the electronic device;
transmitting the advertising packet to the server via the client device as part of a link approval request;
in response to receiving the link approval request, verifying by the server that the electronic device associated with the device identifier is available for provisioning in association with the user account and, when verified, issuing by the server a link approval response to the client device, the link approval response indicating that the electronic device associated with the device identifier is available for provisioning in association with the user account;
in response to receiving the link approval response indicating that the electronic device associated with the device identifier is available for provisioning in association with the user account:
establishing a short range wireless link between the electronic device and the client device;
obtaining, at the client device, network credentials for accessing a secure wireless network;
encrypting, at the client device, at least a portion of the network credentials using a password key generated at the server and communicated from the server to the client device;
sending the encrypted network credentials from the client device to the electronic device over the short range wireless link;
obtaining, at the electronic device, decrypted network credentials by decrypting the encrypted network credentials using a key generated at the electronic device; and
accessing, by the electronic device, the secure wireless network using the decrypted network credentials.

* * * * *